United States Patent
Hamano et al.

(10) Patent No.: US 6,747,769 B2
(45) Date of Patent: Jun. 8, 2004

(54) COMPUTER-GENERATED HOLOGRAM AND ITS FABRICATION PROCESS, REFLECTOR USING A COMPUTER-GENERATED HOLOGRAM, AND REFLECTIVE LIQUID CRYSTAL DISPLAY

(75) Inventors: Tomohisa Hamano, Tokyo (JP); Mitsuru Kitamura, Tokyo (JP); Daijiro Kodama, Tokyo (JP); Hiroshi Fujita, Tokyo (JP); Hideo Yabuhara, deceased, late of Tokyo (JP); by Manami Yabuhara, legal representative, Saitama (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/866,605

(22) Filed: May 30, 2001

(65) Prior Publication Data

US 2002/0001109 A1 Jan. 3, 2002

(30) Foreign Application Priority Data

May 30, 2000 (JP) ........................................ 2000-159914
Jun. 9, 2000 (JP) ........................................ 2000-173935
Jul. 19, 2000 (JP) ........................................ 2000-219582

(51) Int. Cl.$^7$ .............................................. G03H 1/08
(52) U.S. Cl. ............................................ 359/9; 359/599
(58) Field of Search ........................ 359/3, 9, 25, 599, 359/15; 430/1, 2

(56) References Cited

U.S. PATENT DOCUMENTS

| | | | | |
|---|---|---|---|---|
| 5,153,751 A | * | 10/1992 | Ishikawa et al. | 359/13 |
| 5,936,751 A | | 8/1999 | Wenyon | 359/15 |
| 6,166,833 A | * | 12/2000 | Mendlovic et al. | 359/9 |
| 6,421,148 B2 | * | 7/2002 | Steiner | 359/15 |

\* cited by examiner

Primary Examiner—Drew Dunn
Assistant Examiner—Alessandro Amari
(74) Attorney, Agent, or Firm—Sughrue Mion, PLLC

(57) ABSTRACT

The invention provides a computer-generated hologram which can be viewed in white at the desired viewing region and a reflective liquid crystal display using the same as a reflector. The computer-generated hologram H is designed to diffuse light having a given reference wavelength $\lambda_{STD}$ and incident thereon at a given angle of incidence $\theta$ in a specific angle range. In a range of wavelengths $\lambda_{MIN}$ to $\lambda_{MAX}$ including the reference wavelength $\lambda_{STD}$ wherein zero-order transmission light or zero-order reflection light of incident light on the computer-generated hologram at a given angle of incidence is seen in white by additive color mixing, the maximum diffraction angle $\beta_{2MIN}$ of incident light of the minimum wavelength $\lambda_{MIN}$ in the wavelength range and incident at the angle of incidence $\theta$ is larger than the minimum diffraction angle $\beta_{1MAX}$ of incident light of the maximum wavelength $\lambda_{MAX}$ in the wavelength range and incident at said angle of incidence $\theta$.

22 Claims, 17 Drawing Sheets

FIG. 7(a)
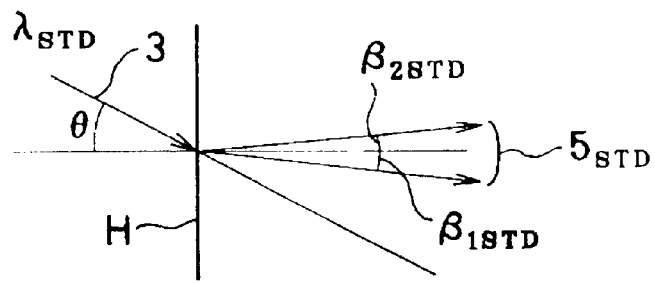
FIG. 7(b)     FIG. 7(c)
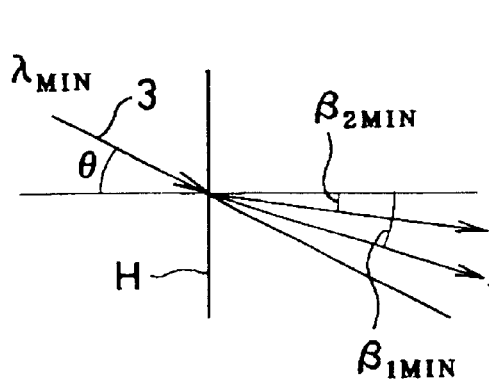 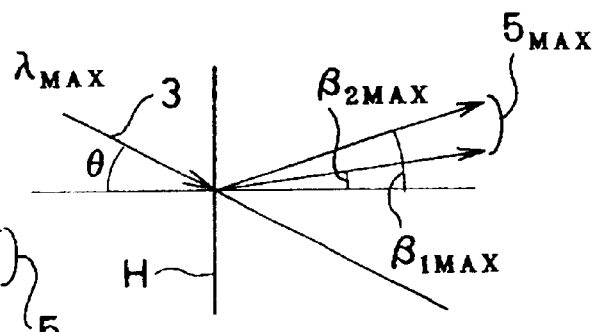
FIG. 8
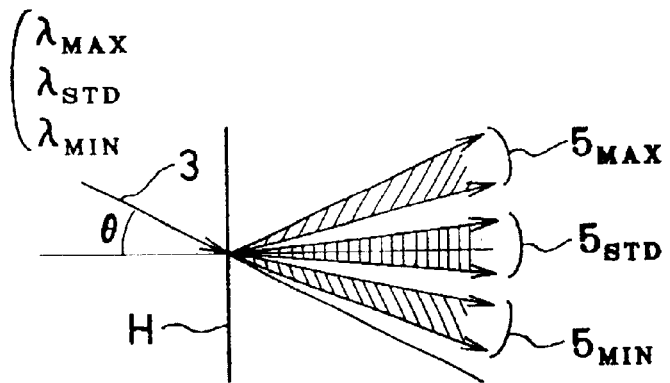

FIG. 9(a)
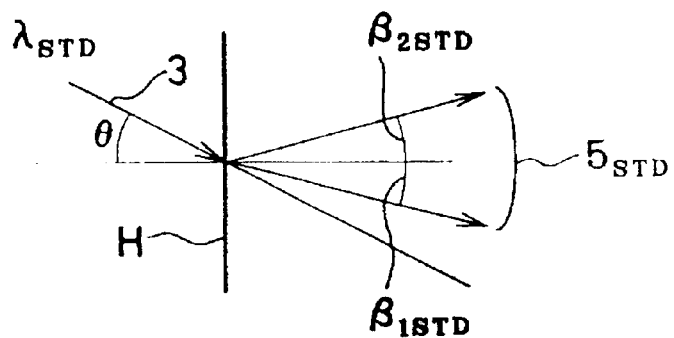
FIG. 9(b)    FIG. 9(c)
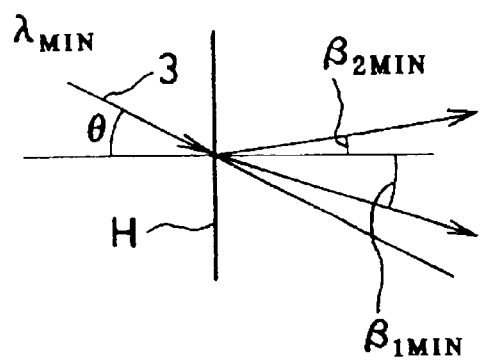 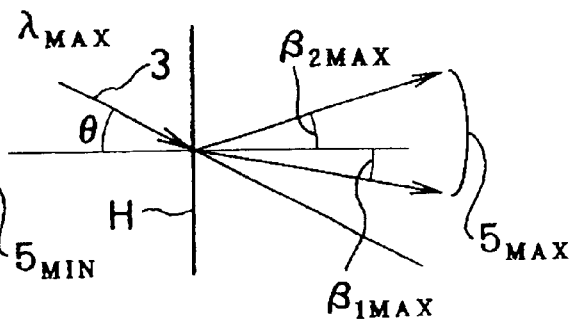
FIG. 10
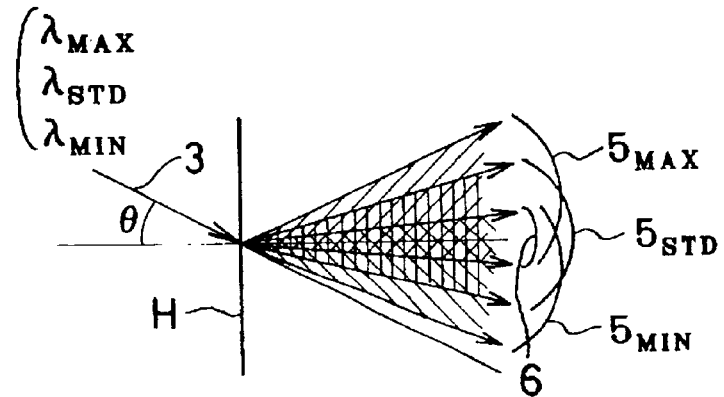

COMPUTER-GENERATED HOLOGRAM AND ITS FABRICATION PROCESS, REFLECTOR USING A COMPUTER-GENERATED HOLOGRAM, AND REFLECTIVE LIQUID CRYSTAL DISPLAY

BACKGROUND OF THE INVENTION

The present invention relates generally to a computer-generated hologram, and more particularly to a computer-generated hologram suitable for use as a reflector and its fabrication process as well as a reflective liquid crystal display using a computer-generated hologram.

Of a variety of display systems already put to practical use, liquid crystal display systems have now wide applications because they have some advantages of low power consumption, color display capability, low-profile size, and low weight.

Instead of LCDs, it is difficult to use other type of displays for terminal equipment having no other choice to rely on batteries or accumulators.

However, LCDs cannot emit light by themselves; in other words, extraneous light or illumination light is necessary for viewing images irrespective of whether they are of the reflection type or the transmission type.

However, the use of sufficiently bright illumination light goes against the valuable advantage of low power consumption. Accordingly, even when illumination light is used, it is unreasonable to make use of illumination having relatively high illuminance; whether the light used is extraneous light or illumination light, how limited light is effectively used is of vital importance.

The applicant has already filed patent applications (JP-A's 11-296054 and 11-183716) to come up with computer-generated holograms having a phase distribution capable of diffracting obliquely incident light in a predetermined viewing region. Of both, JP-A 11-296054 discloses a computer-generated hologram having a phase distribution for allowing light incident thereon at an oblique angle of incidence to be diffracted into the predetermined viewing region.

To fabricate these computer-generated holograms which are still found to have the desired effects, however, it is required to use a time-consuming, inefficient fabrication process comprising the steps of using a computer to find phase distributions all over the hologram region by computations, and making a relief pattern for the replication of computer-generated holograms on the basis of computation results.

For photoetching in particular, it is preferable to make use of a photomask fabrication system because precise exposure is needed. However, the photomask fabrication system has some disadvantages of high cost, severe fabrication conditions and extended fabrication time, in which the extended fabrication time in particular offers a grave problem.

SUMMARY OF THE INVENTION

One object of the present invention is to provide a novel computer-generated hologram which can be viewed in white at the desired viewing region, and a reflective liquid crystal display using the same as a reflector.

Another object of the present invention is to eliminate a problem in association with the fabrication of a relief pattern for computer-generated hologram fabrication, and especially a time problem in connection with data processing on aligners for photoetching.

Throughout the present disclosure, the term "photoetching" is understood to mean a photostep for providing the desired pattern to a photosensitive material by means of laser light, electron beams or the like and etching the pattern into a relief configuration.

Yet another object of the present invention is to provide a computer-generated hologram which has improved optical diffraction efficiency, allows a master pattern to be easily obtained for replication purposes, is easy to fabricate, and enables its relief surface to come into contact with the back surface of a light transmission display device as well as a reflective liquid crystal display using the same as a reflector.

According to the first invention to achieve the aforesaid first object, there is provided a computer-generated hologram designed to diffuse light having a given reference wavelength and incident thereon at a given angle of incidence in a specific angle range, characterized in that, in a range of wavelengths including said reference wavelength wherein zero-order transmission light or zero-order reflection light incident on said computer-generated hologram at a given angle of incidence is seen in white by additive color mixing, the maximum diffraction angle of incident light of the minimum wavelength in said range and incident at said angle of incidence is larger than the minimum diffraction angle of incident light of the maximum wavelength in said range and incident at said angle of incidence.

Preferably in this case, the computer-generated hologram comprises an array of two-dimensionally arranged minute cells, wherein each cell has an optical path length for imparting a unique phase to reflection light or transmission light, and a phase distribution obtained by adding a first phase distribution that substantially diffracts a vertically incident light beam within a given viewing region and does not substantially diffract the light beam toward other region to a second phase distribution that allows an obliquely incident light beam at a given angle of incidence to leave the cell vertically.

Alternatively, the computer-generated hologram may comprise an array of two-dimensionally arranged minute cells, wherein each cell has an optical path length for imparting a unique phase to reflection light or transmission light as well as a phase distribution which substantially diffracts an obliquely incident light beam at a given angle of incidence within a given viewing region and does not substantially diffract the light beam toward other region and which substantially diffracts a vertically incident light beam within another region shifted from said given viewing region and does not substantially diffract the light beam toward a region except for said another region.

Practically, the cells are arranged in columns and rows just like checkers.

Further, the computer-generated hologram may be a reflection computer-generated hologram wherein a reflective layer is provided on a relief pattern provided on the surface of the substrate.

Further, the computer-generated hologram may be constructed in such a way as to be adaptable to the minimum wavelength of 450 nm and the maximum wavelength of 650 nm.

Preferably, the computer-generated hologram should satisfy:

$$\lambda_{MIN}/\lambda_{MAX} \geq (\sin \beta_{1STD} - \sin \theta)/(\sin \beta_{2STD} - \sin \theta) \quad (11)$$

where θ is the angle of incidence of illumination light, $\lambda_{MIN}$ is the minimum wavelength, $\lambda_{MAX}$ is the maximum wavelength, $\beta_{1STD}$ is the minimum diffraction angle at a given reference wavelength $\lambda_{STD}$ and $\beta_{2STD}$ is the maximum diffraction angle at the given reference wavelength $\lambda_{STD}$.

It is also preferable that the computer-generated hologram satisfies:

$$\sin\theta \geq (\lambda_{MAX}\sin\beta_{1STD} - \lambda_{MIN}\sin\beta_{2STD})/(\lambda_{MAX} - \lambda_{MIN}) \qquad (12)$$

where $\theta$ is the angle of incidence of illumination light, $\lambda_{MIN}$ is the minimum wavelength, $\lambda_{MAX}$ is the maximum wavelength, $\beta_{1STD}$ is the minimum diffraction angle at a given reference wavelength $\lambda_{STD}$ and $\beta_{2STD}$ is the maximum diffraction angle at the given reference wavelength $\lambda_{STD}$.

A display system of the invention is characterized by using any one of the aforesaid computer-generated holograms as a reflector.

One reflective liquid crystal display system of the invention is characterized in that any one of the aforesaid computer-generated holograms is disposed as a reflector on the back surface thereof.

Another reflective liquid crystal display system of the invention is characterized in that any one of the aforesaid computer-generated holograms is interposed as a reflector between a liquid crystal layer thereof and a back surface substrate thereof.

According to the invention to achieve the aforesaid first object, the computer-generated hologram is constructed such that, in a range of wavelengths including the reference wavelength wherein zero-order transmission light or zero-order reflection light incident on the computer-generated hologram at a given angle of incidence is seen in white by additive color mixing, the maximum diffraction angle of incident light of the minimum wavelength in said range and incident at said angle of incidence is larger than the minimum diffraction angle of incident light of the maximum wavelength in said range and incident at said angle of incidence. Thus, the computer-generated hologram can be seen in white in the angle range defined between the maximum diffraction angle of the minimum wavelength and the minimum diffraction angle of the maximum wavelength, and there is no change in the color seen even when the viewer moves his eyes within that range. This computer-generated hologram is suitable for reflector in reflective LCDs.

In one typical process for the fabrication of computer-generated holograms used so far in the art, phase distributions are calculated all over the region of the hologram to be fabricated. Then, a large amount of data are entered into an aligner on the basis of the results of calculations for exposure processing. According to the invention provided to achieve the aforesaid second object, a computer-generated hologram is constructed of an array of minute elemental hologram pieces arranged in columns and rows. Then, the calculation of the phase distribution is performed only for the minute elemental hologram piece by far smaller than the entire computer-generated hologram. When exposure is carried out for photoetching, too, a much smaller amount of data on the minute elemental hologram piece than before are used, so that loads on the data processing on the aligner can be alleviated to reduce the overall exposure time. Thus, the twelfth invention provided to achieve the second object has been accomplished.

That is, the twelfth invention provided to achieve the second object relates to a computer-generated hologram comprising minute elemental hologram pieces closely arranged on a plane, characterized in that each elemental hologram piece has an optical path length enough to impart an identical phase distribution to reflection light or transmission light.

The thirteenth invention provided to achieve the second object and according to the twelfth invention relates to a computer-generated hologram designed to diffuse light having a given reference wavelength and incident thereon at a given angle of incidence in a specific angle range, characterized in that, in a range of wavelengths including said reference wavelength wherein zero-order transmission light or zero-order reflection light incident on said computer-generated hologram at a given angle of incidence is seen in white by additive color mixing, the maximum diffraction angle of incident light of the minimum wavelength in said range and incident at said angle of incidence is larger than the minimum diffraction angle of incident light of the maximum wavelength in said range and incident at said angle of incidence.

The fourteenth invention provided to achieve the second object and according to the twelfth or thirteenth invention relates to a computer-generated hologram, characterized in that each elemental hologram piece has a phase distribution obtained by adding a first phase distribution that substantially diffracts a vertically incident light beam within a given viewing region and does not substantially diffract the light beam toward other region to a second phase distribution that allows an obliquely incident light beam at given angle of incidence to leave the elemental hologram piece vertically.

The fifteenth invention provided to achieve the second object and according to the twelfth or thirteenth invention relates to a computer-generated hologram, characterized in that each elemental hologram piece a phase distribution which substantially diffracts an obliquely incident light beam at a given angle of incidence within a given viewing region and does not substantially diffract the light beam toward other region and which substantially diffracts a vertically incident light beam within another region shifted from said given viewing region and does not substantially diffract the light beam toward a region except for said another region.

The sixteenth invention provided to achieve the second object is characterized in that the computer-generated hologram according to any one of the aforesaid twelfth to fifteenth inventions comprises a resin layer including a hologram.

The seventeenth invention provided to achieve the second object is characterized in that the computer-generated hologram according to the aforesaid sixteenth invention further comprises a transparent substrate for supporting the resin layer including a hologram.

The eighteenth invention provided to achieve the second object is characterized in that the computer-generated hologram according to any one of the aforesaid twelfth to seventeenth inventions is defined by a relief pattern on the surface of a hologram-forming layer.

The nineteenth invention provided to achieve the second object is characterized in that the computer-generated hologram according to the aforesaid eighteenth invention further comprises an optical reflective layer laminated on and along said relief pattern.

The 20th invention provided to achieve the second object is characterized in that in the aforesaid 18th invention, said optical reflective layer is laminated on the other bare surface of said hologram-forming layer which is free from said relief pattern.

The 21th invention provided to achieve the second object relates to a reflector characterized by using the computer-generated hologram according to any one of the aforesaid 12th to 20th inventions.

The 22nd invention provided to achieve the second object relates to a reflective liquid crystal display characterized in that the computer-generated hologram according to claim 10 is disposed on a back surface thereof.

The 23rd invention provided to achieve the second object relates to a reflective liquid crystal display characterized in that the computer-generated hologram according to the aforesaid 21st invention is interposed between a liquid crystal layer and a back substrate in said liquid crystal display.

The 24th invention provided to achieve the second object relates to a computer-generated hologram fabrication process characterized by defining a range which diffraction light obtained by diffraction of incident light leaves, determining a hologram phase distribution for allowing said diffraction light to leave the defined range, quantizing the determined phase distribution to find a quantized depth of a hologram relief, forming a relief on a substrate by photoetching on the basis of the found quantized depth to obtain a relief pattern, and patterning a resin layer using said relief pattern to form a hologram relief on the surface of said resin layer.

The 25th invention provided to achieve the second object relates to a computer-generated hologram fabrication process characterized by defining a range which diffraction light obtained by diffraction of incident light leaves, determining a hologram phase distribution for allowing said diffraction light to leave the defined range, quantizing the determined phase distribution to find a quantized depth of a hologram relief and the number of steps of said depth, repeating photoetching given times corresponding to the obtained depth and the number of steps to form a relief pattern on an etching substrate, and patterning a resin layer using said relief pattern to form a hologram relief on the surface of said resin layer.

The 26th invention provided to achieve the second object relates to the computer-generated hologram fabrication process according to the aforesaid 24th or 25th invention, characterized in that said phase distribution is determined per minute elemental hologram piece forming the hologram, and said relief is formed on the basis of a phase distribution obtained by repeatedly arranging a phase distribution of said elemental hologram piece in a longitudinal direction of said substrate.

The 27th invention provided to achieve the second object relates to the computer-generated hologram fabrication process according to any one of the aforesaid 24 to 26th inventions, characterized in that an optical reflective layer is laminated on and along a relief side or other side of said resin layer.

The 28th invention provided to achieve the second object relates to the computer-generated hologram fabrication process according to any one of the aforesaid 24th to 26th inventions, characterized in that the number of steps L having the depth of said relief is the N-th power of 2 where N is the number of photoetching cycles.

Reference is then made to a computer-generated hologram constructed to achieve the aforesaid third object of the present invention. This computer-generated hologram comprises a transparent plate material having a light refractive index higher than that of air and a blaze pattern of sawtoothed shape in section, which blaze pattern is disposed on the back surface of the transparent plate, and is designed in such a way that the depth d of the blaze is equivalent to a half wavelength or $d=\lambda/2n$ wherein $\lambda$ is the wavelength of reference light and n is the light refractive index of the transparent plate. This computer-generated hologram can provide solutions to prior art problems in conjunction with diffraction efficiency, master pattern fabrication and replication and applications. Thus, the present invention provides such a computer-generated hologram as well as a reflector and a reflective LCD constructed using the same.

The 29th invention provided to achieve the third object relates to a computer-generated hologram characterized in that a blaze pattern of sawtoothed shape in section is formed on a back side of a transparent substrate and the depth d of said blaze pattern is $d=\lambda/2n$ where $\lambda$ is the wavelength of reference light and n is the light refractive index of a material forming said transparent plate.

The 30th invention provided to achieve the third object relates to a computer-generated hologram characterized in that a blaze pattern of sawtoothed shape in section is formed on a back side of a transparent substrate with N steps having differences in level and the depth d of said blaze pattern is $d=\lambda/2n$ where $\lambda$ is the wavelength of reference light and n is the light refractive index of a material forming said transparent plate.

The 31st invention provided to achieve the third object relates to the computer-generated hologram according to the aforesaid 29th or 30th invention, characterized in that an optical reflective layer is laminated on and along said blaze pattern formed on the back surface of said transparent plate.

The 32nd invention provided to achieve the third object relates to the computer-generated hologram according to any one of the aforesaid 29th to 31st inventions, characterized in that the front surface of said transparent plate has been subject to antireflection treatment.

The 33rd invention provided to achieve the third object relates to a reflector characterized by using the computer-generated hologram according to any one of the aforesaid 29th to 32nd inventions.

The 34th invention provided to achieve the third object relate to the reflector according to the aforesaid 33rd invention, characterized in that a transparent adhesive layer is laminated on the front surface of said transparent plate.

The 35th invention provided to achieve the third object relates to a reflective liquid crystal display characterized in that said front surface of the reflector according to the aforesaid 33rd invention is in close contact with the back surface of said liquid crystal display.

The 36th invention provided to achieve the third object relates to a reflective liquid crystal display characterized in that said front surface of the reflector according to the aforesaid 34th invention is laminated on the back surface of said liquid crystal display with said transparent adhesive layer interposed therebetween.

The 37th invention provided to achieve the third object relates to the reflective liquid crystal display according to the aforesaid 35th or 36th invention, characterized in that a liquid crystal display device and said transparent plate in said reflector have a substantially identical light refractive index, or said liquid crystal display device, said transparent adhesive layer and said transparent plate in said reflector have a substantially identical light refractive index.

The 38th invention provided to achieve the third object relates to a reflective liquid crystal display characterized in that the computer-generated hologram according to the aforesaid 33rd invention is interposed between the liquid crystal layer and the back substrate in said liquid crystal display with the front surface of said computer-generated hologram opposite to said liquid crystal layer.

The 39th invention provided to achieve the third object relates to a reflective liquid crystal display characterized in that said front surface of the reflector according to the aforesaid 33rd invention is in close contact with the back surface of a light transmission display.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 7(a), 7(b) and 7(c) are illustrative of diffraction for each wavelength in a narrow viewing range.

FIG. 8 is illustrative of diffraction of each wavelength in a narrow viewing range.

FIGS. 9(a), 9(b) and 9(c) are illustrative of diffraction for each wavelength in a wide viewing range.

FIG. 10 is illustrative of diffraction of each wavelength in a wide viewing range.

FIG. 11 is illustrative of a phase distribution on the hologram surface of one embodiment of the computer-generated hologram according to the invention.

FIG. 12 is illustrative of an amplitude distribution on a reconstruction plane when the computer-generated hologram of the FIG. 11 embodiment is vertically illuminated at the design wavelength.

FIG. 13 is illustrative of an amplitude distribution on a reconstruction plane when the computer-generated hologram of the FIG. 11 embodiment is obliquely illuminated at the reference wavelength.

FIG. 14 is illustrative of an amplitude distribution on a reconstruction plane when the computer-generated hologram of the FIG. 11 embodiment is obliquely illuminated at the minimum wavelength.

FIG. 15 is illustrative of an amplitude distribution on a reconstruction plane when the computer-generated hologram of the FIG. 11 embodiment is obliquely illuminated at the maximum wavelength.

DESCRIPTION OF THE PREFERRED EMBODIMENTS

The computer-generated hologram 1 according to the present invention is a composite or compound-eye array wherein computer-generated hologram pieces or minute elemental hologram pieces 2 are closely arranged on a plane.

Figure 1A:
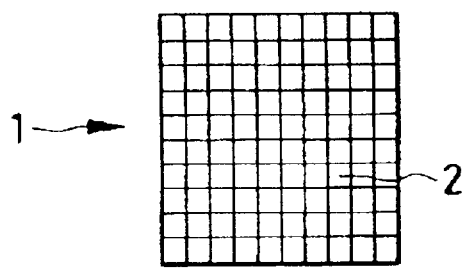
FIGS. 1(a), 1(b) and 1(c) are illustrative of a computer-generated hologram comprising an array of elemental hologram pieces.
Figure 1B:
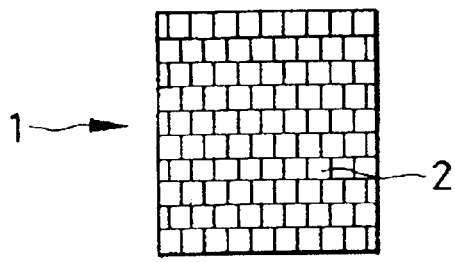
Figure 1C:
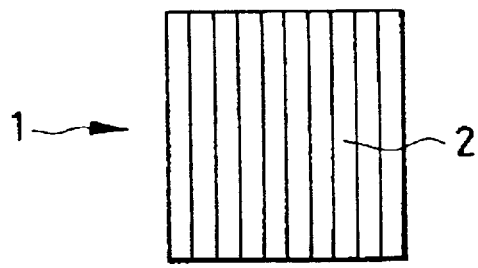

The computer-generated hologram 1 of FIG. 1(a) is designed as a grid array of square elemental hologram pieces 2 arranged in columns and rows. As shown in FIG. 1(b), the square elemental hologram pieces 2 in an even row (e.g., the second or fourth row) may be shifted transversely with respect to those in an odd row by a half pitch. Alternatively, elemental holograms 2 of rectangular slim shape may be closely arranged side by side, as shown in FIG. 1(c).

In any of the aforesaid computer-generated holograms 1, all adjacent elemental hologram pieces 2 are the same. In other words, each hologram piece 2 has an optical path length enough to impart the same phase to reflection light or transmission light.

Such computer-generated holograms 1 have a structure well suitable for reducing loads on a fabrication system; that is, the process of fabricating the elemental hologram pieces 2 under the necessary conditions is repeatedly carried out while a material forming the hologram 1 or a relief pattern for giving the hologram 1 is displaced, as will be described later.

Figure 2A:
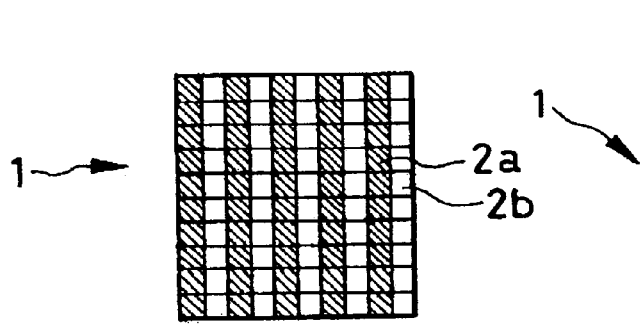
FIGS. 2(a), 2(b) and 2(c) are illustrative of some combinations of elemental hologram pieces.
Figure 2B:
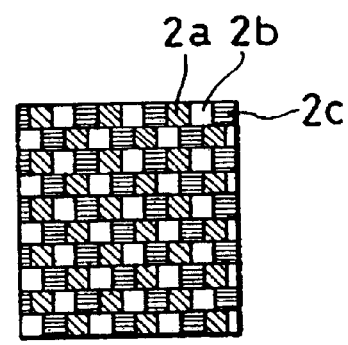
Figure 2C:
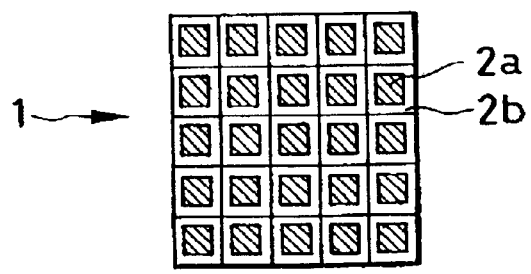

FIGS. 2(a), 2(b) and 2(c) show a composite or compound-eye computer-generated hologram 1 comprising at least two types of minute elemental hologram pieces 2.

Referring first to FIG. 2(a), two kinds of minute elemental hologram pieces 2a and 2b having different optical path lengths for imparting different phases to reflection light or transmission light. As shown, one elemental hologram pieces 2a are arranged every other in a row while the other elemental hologram pieces 2b are arranged between adjacent pieces 2a. Thus, the elemental hologram pieces 2 used herein may be defined by such different sets of elemental hologram pieces.

It is here noted that the elemental hologram pieces 2a and 2b may be arranged in columns rather than in rows.

As shown in FIG. 2(b), three kinds of elemental hologram pieces 2a, 2b and 2c may be used in a group, and as shown in FIG. 2(c), one elemental hologram piece 2a may be surrounded with the other elemental hologram pieces 2b.

Thus, if the computer-generated hologram 1 comprises a plurality of groups of different elemental hologram pieces, then the hologram 1 can possess the respective properties of a plurality of elemental hologram pieces 2a, 2b, . . . .

As in the computer-generated holograms 1 of FIGS. 1(a) to 1(b), the computer-generated holograms 1 of FIGS. 2(a) to 2(b), too, have a structure well suitable for reducing loads on a fabrication system; that is, the process of fabricating the elemental hologram pieces 2 under the necessary conditions is repeatedly carried out while a material forming the hologram 1 or a relief pattern for giving the hologram 1 is displaced, as will be described later.

The shape of each elemental hologram piece 2 used herein is not necessarily limited to a quadrilateral such as a square or rectangle. In other words, other polygonal elemental hologram pieces may be used. For instance, triangular elemental hologram pieces 2 can be closely arranged in a row if one of adjacent hologram pieces is located inversely with respect to the other and hexagonal elemental hologram pieces can be closely arranged if pieces in one row are displaced by a half pitch with respect to those in a row just below it, as shown in FIG. 1(b).

Alternatively, if octagonal elemental hologram pieces 2 are combined with square elemental hologram pieces 2 with their sides having the same length as one side of the octagon, groups of two kinds of different elemental hologram pieces can then be arranged.

Although not critical, the computer-generated hologram 1 of the present invention has usually a size of about 1 cm to about a few tens of cm. Each elemental hologram piece 2, of whatever type, has a size of about a few tens of $\mu$m to about 1 mm as an example. For instance, an elemental hologram piece 2 of 250 $\mu$m×250 $\mu$m in size accounts for $\frac{1}{40,000}$ of a computer-generated hologram 2 of 5 cm×5 cm in size.

In context of the computer-generated hologram 1 of the present invention, the "closely arranged elemental hologram pieces 2" is understood to mean an array of elemental hologram pieces 2 slightly spaced away from one another, to say nothing of an array of elemental hologram pieces 2 brought in perfect contact with one another.

For the elemental hologram 2 in the computer-generated hologram 1 of the present invention, use is made of (1) the computer-generated hologram obtained on the basis of JP-A 11-187316, (2) the computer-generated hologram obtained on the basis of JP-A 11-296054, and (3) the novel computer-generated hologram which can be viewed in white at the desired viewing region and proposed by the present invention on the premise of the computer-generated hologram (1) or (2). In this regard, it is appreciated that this computer-generated hologram (3) may not only be used as the elemental holograms 2 and 2a to 1c of FIGS. 1 and 2 but may also be used by themselves as a reflector having similar properties.

First of all, the computer-generated hologram (1) or (2) is explained.

The computer-generated hologram obtained on the basis of JP-A 11-187316 comprises an array of two-dimensionally arranged minute cells. Each cell has an optical path length enough to impart a unique phase to reflection light or transmission light, and a phase distribution obtained by adding the first phase distribution that substantially diffracts a vertically incident light beam within a given viewing region and does not substantially diffract the light beam toward other region to the second phase distribution that allows an obliquely incident light beam at a given angle of incidence to leave the cell vertically.

Figure 3A:
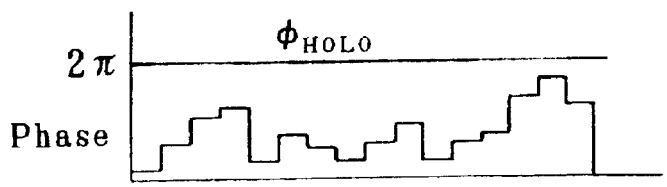
FIGS. 3(a), 3(b) and 3(c) are representations illustrative of some examples of phase distributions for computer-generated holograms.

Here, the first phase distribution is a phase distribution for the computer-generated hologram which, when the hologram plane is vertically illuminated with parallel light, diffracts the light to the given viewing region alone. For instance, the first phase distribution may be such a phase distribution $\phi_{HOLO}$ as illustrated in FIG. 3(a).

Figure 3B:
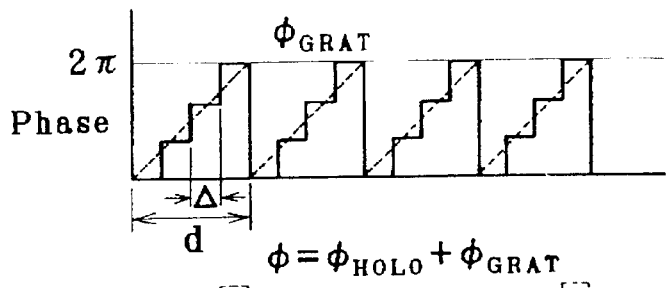

The second phase distribution is provided for a phase diffraction grating which diffracts light incident from behind at an angle of incidence $\theta$ in the forward direction. In other words, this is a phase distribution $\phi_{GRAT}$ obtained by approximating such a phase distribution as indicated by broken lines in FIG. 3(b) in the form of a digital step-formed function.

Figure 3C:
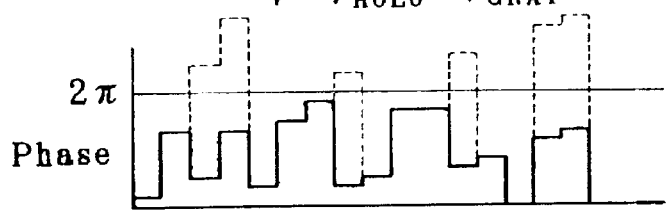

The phase distribution obtained by the addition of two such phase distributions $\phi_{HOLO}$ and $\phi_{GRAT}$ provides the phase distribution $\phi$ of the computer-generated hologram set forth in JP-A 11-183716 and shown in FIG. 3(c), and the computer-generated hologram having this phase distribution $\phi$ acts to diffract the light obliquely incident from behind at the angle of incidence $\theta$ toward the given viewing region in the forward direction.

Generally, a computer-generated hologram is found as follows.

Now consider a certain hologram. When the hologram plane is vertically illuminated with parallel light at a reconstruction distance much larger than the size of the hologram, the diffraction light obtained at the reconstruction plane is represented in terms of an amplitude distribution at the hologram plane and the Fourier transform of a phase distribution (Fraunhofer diffraction).

To impart given diffraction light to the reconstruction plane, a computer-generated hologram positioned at the hologram plane has so far been found by a method wherein the Fourier transform and inverse Fourier transform are alternately repeated between the hologram plane and the reconstruction plane with the application of constraints. This method is known as the Gerchberg-Saxton iterative algorithm method.

Here let h(x, y) represent the distribution of light at the hologram plane and f(u, v) indicate the distribution of light at the reconstruction plane. Then, these distributions of light are written as:

$$h(x, y) = A_{HOLO}(x, y)\exp(i\phi_{HOLO}(x, y)) \quad (1)$$

$$f(u, v) = A_{IMG}(u, v)\exp(i\phi_{IMG}(u, v)) \quad (2)$$

where $A_{HOLO}(x, y)$ is an amplitude distribution at the hologram plane, $\phi_{HOLO}(x, y)$ is a phase distribution at the hologram plane, $A_{IMG}(u, v)$ is an amplitude distribution at the reconstruction plane and $\phi_{IMG}(u, v)$ is a phase distribution at the reconstruction plane.

Then, the aforesaid Fourier transform and inverse Fourier transform are given by $$f(u, v) = \int\int_{-\infty}^{\infty} h(x, y)\exp\{-i(ux+vy)\}dxdy \quad (3)$$

$$h(x, y) = \int\int_{-\infty}^{\infty} f(u, v)\exp\{i(ux+vy)\}dxdy \quad (4)$$

Consider the case where using this Gerchberg-Saxton iterative algorithm method, a computer-generated hologram is obtained, which hologram diffracts parallel light toward the given viewing region alone when the hologram plane is vertically illuminated with the parallel light.

For a better understanding of the following discussions, the amplitude distribution $A_{HOLO}(x, y)$ at the hologram plane is represented by $A_{HOLO}$, the phase distribution $\phi_{HOLO}(x, y)$ at the hologram plane by $\phi_{HOLO}$, the amplitude distribution $A_{IMG}(u, v)$ at the reconstruction plane by $A_{IMG}$, and the phase distribution $\phi_{IMG}(u, v)$ at the reconstruction plane by $\phi_{IMG}$.

Figure 5:
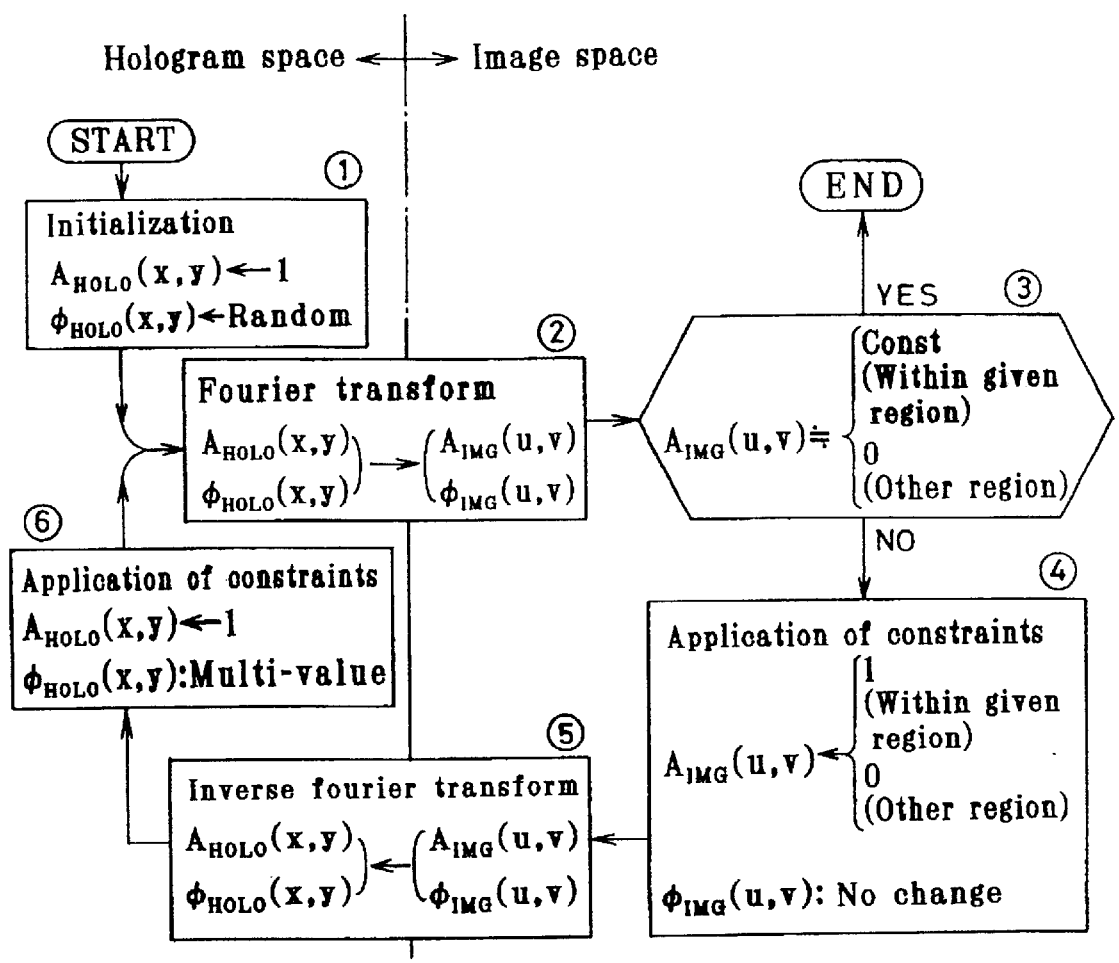
FIG. 5 is a flowchart illustrative of calculation steps for a computer-generated hologram.
Figure 6:
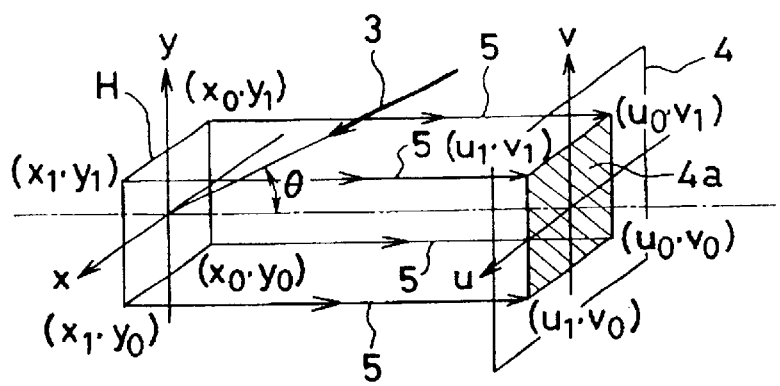
FIG. 6 is illustrative of the range of emergent light with respect to incident light.

FIG. 5 is a flowchart to this end. At step (1), the hologram amplitude $A_{HOLO}$ and hologram phase $\phi_{HOLO}$ are initialized to 1 and a random value, respectively, at hologram plane regions $x_0 \leq x \leq x_1$ and $y_0 \leq y \leq y_1$ in FIG. 6, and at step (2), the thus initialized values are subject to the aforesaid Fourier transform (3). If, at step (3), the amplitude $A_{IMG}$ at the reconstruction plane, obtained by the Fourier transform, has a substantially constant value within the given regions, e.g., $u_0 \leq u \leq u_1$ and $v_0 \leq v \leq v_1$, and becomes substantially zero within other regions, then the amplitude and phase initialized at step (1) provide a desired computer-generated hologram.

If, at step (3), such conditions are not satisfied, then constraints are applied at step (4). For instance, a value of 1 is imparted to the amplitude $A_{IMG}$ at the reconstruction plane within the aforesaid given regions and a value of 0 is applied within other regions, while the phase $\phi_{IMG}$ at the reconstruction plane is kept intact. After such constraints are applied, the aforesaid inverse Fourier transform (4) is applied at step (5). At step (6), constraints are applied to the value at the hologram plane, obtained by the inverse Fourier transform, to take the amplitude $A_{HOLO}$ as 1 and allow the phase $\phi_{HOLO}$ to have many values (bring the original function approximate to a digital step-formed function (quantization)). It is noted that when the phase $\phi_{HOLO}$ is allowed to have a continuous value, such a multi-valued phase is not always needed.

Then, the value is subjected to the Fourier transform at step (2). If, at step (3), the amplitude $A_{IMG}$ at the reconstruction plane, obtained by the Fourier transform, has a substantially constant value within the given regions, e.g., $u_0 \leq u \leq u_1$ and $v_0 \leq v \leq v_1$, and becomes substantially zero within other regions, then the amplitude and phase, to which the constraints are applied at step (1), provide a desired computer-generated hologram.

If, at step (3), such conditions are not satisfied, then the loop of steps (4)→(5)→(6)→(2)→(3) is repeated until the conditions for step (3) are satisfied (or converged), so that the final desired computer-generated hologram can be obtained.

For an estimating function for indicating that the amplitude $A_{IMG}$ at the reconstruction plane is converged to a substantial given value at step (3), for instance, the following expression (5) may be used.

However, the Σ (sum) with respect to u and v means the sum of the values at $u_0 \leq u \leq u_1$ and $v_0 \leq v \leq v_1$ for the cells in the hologram, and $<A_{IMG}(v, v)>$ represents an ideal amplitude in the cell. For instance, when this estimating function is 0.01 or less, the function is assumed to be converged.

Alternatively, the following expression (6) using a difference between the previous amplitude value and the present amplitude value in the repetition of the calculation loop may be used as the estimating function.

Here $A_{IMGi-1}$ is the previous amplitude value and $A_{IMGi}$ is the present amplitude value.

$$\text{Estimating Function} = 1/N^2 \times \sum_{u,v} |A_{IMG}(u, v) - \langle A_{IMGi-1}(u, v) \rangle| \quad (5)$$

$$\text{Estimating Function} = 1/N^2 \times \sum_{u,v} |A_{IMGi}(u, v) - A_{IMGi-1}(u, v)| \quad (6)$$

From the thus found phase distribution, the depth distribution of an actual hologram is found. Regarding how to find the depth distribution, there is a difference between a reflection hologram and a transmission hologram. When the hologram is of the reflection type, expression (7a) is used and when the hologram is of the transmission type, expression (7b) is used. In other words, φ of FIG. 3(c) (φ(x, y) in the following expressions) is transformed to the depth D of the computer-generated hologram (D(x, y) in the following expressions).

$$D(x, y) = \lambda\phi(x, y)/(4\pi n) \quad (7a)$$

$$D(x, y) = \lambda\phi(x, y)/\{2\pi(n_1 - n_0)\} \quad (7b)$$

Here (x, y) is the coordinates indicative of a position on the hologram plane, λ is the reference wavelength, n is the refractive index of the material forming the light incident side of the reflection surface in the reflection hologram, and $n_1$ and $n_0$ are the refractive indices of the two materials forming the transmission hologram provided that $n_1 > n_0$.

As will also be explained later, a relief pattern having a depth D(x, y) found from the aforesaid expressions (7a) and (7a) for each minute cell having a lengthwise×breadthwise size Δ is formed on the surface of a hologram-forming resin layer, with a given reflective layer laminated thereon. The resultant hologram can be used as a hologram with enhanced effects.

This Δ, for instance, is equivalent to the feed pitch of exposure light.

Reference is now made to the computer-generated hologram obtained on the basis of JP-A 11-296054. This computer-generated hologram comprises an array of two-dimensionally arranged minute cells. Each cell has an optical path length enough to impart a unique phase to reflection light or transmission light as well as a phase distribution that substantially diffracts an obliquely incident light beam at a given angle of incidence within a given viewing region and does not substantially diffract the light beam toward other region and a phase distribution that substantially diffracts a vertically incident light beam within another region shifted from said given viewing region and does not substantially diffract the light beam toward a region except for said another region.

That is, a computer-generated hologram H is designed such that when the hologram plane is vertically illuminated with parallel light from behind, the region at which the amplitude distribution $A_{IMG}(u, v)$ at the reconstruction plane is kept substantially constant is designated as the range of $u_0' \leq u' \leq u_1'$ and $v_0' \leq v' \leq v_1'$ shifted from $u_0 \leq u \leq u_1$ and $v_0 \leq v \leq v_1$ and the amplitude distribution $A_{IMG}(u, v)$ becomes substantially zero at other region ((u, v) is the coordinates on the reconstruction plane).

Figure 4A:
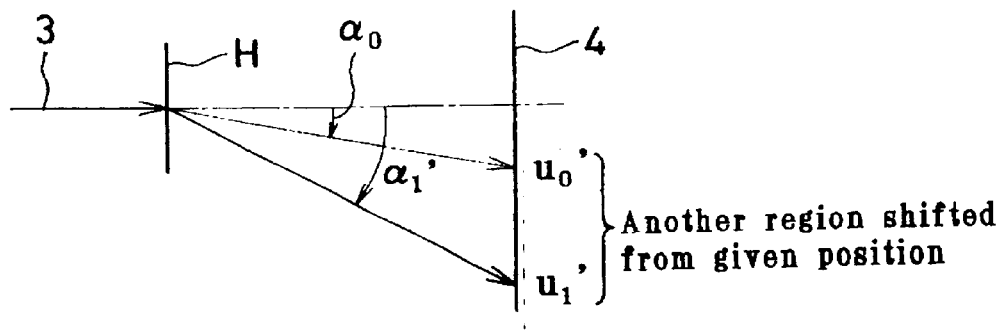
FIGS. 4(a) and 4(b) are illustrative of how a viewing position is shifted.

As shown in FIG. 4(a), a computer-generated hologram H is designed such that when parallel illumination light 3' is vertically incident thereon, light is diffracted only to the range of $u_0' \leq u' \leq u_1'$ and $v_0' \leq v' \leq v_1'$ on a reconstruction plane 4.

When the phase distribution $\phi_{HOLO}(x, y)$ of the computer-generated hologram H is assumed to be a diffraction grating, diffraction by the computer-generated hologram H is represented by the following expression (8) that is a fundamental expression for the diffraction grating.

$$\sin\theta_d - \sin\theta_i = m\lambda/d \quad (8)$$

where m is the order of diffraction, d is the pitch of the diffraction grating, λ is a wavelength, $\theta_i$ is the angle of incidence and $\theta_d$ is a diffraction angle.

From design conditions, $\theta_i = 0$ and $\alpha_0' \leq \theta_d \leq \alpha_1'$. Here $\alpha_0'$ is the angle of diffraction of light from the position of incidence to the position of $u_0'$ at the reconstruction plane 4, and $\alpha_1'$ is the angle of diffraction of light to the position of $u_1'$.

Figure 4B:
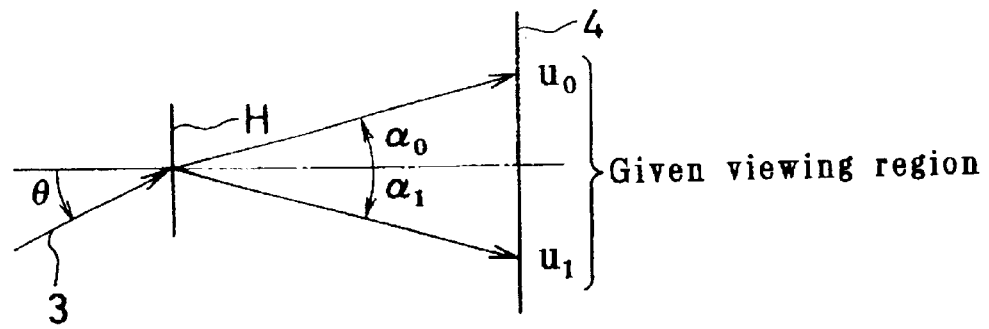

The case where parallel light 3 is obliquely incident on such a computer-generated hologram H at the angle of incidence θ is shown in FIG. 4(b).

From the aforesaid fundamental expression (2) for the diffraction grating, $\theta_i = \theta$ in this case. Assuming that the embodiment shown is positive, the range of diffraction angle $\theta_d$, $\alpha_0 \leq \theta_d \leq \alpha_1$, is shifted from $\alpha_0' \leq \theta_d \leq \alpha_1'$ to a smaller range, so that, as shown in FIG. 4(b), the diffraction range, $u_0 \leq u_d \leq u_1$ (where $u_0$ is a position at which diffraction light is incident from the incidence position on the reconstruction plane 4 at a diffraction angel $\alpha_0$, and $u_1$ is a position at which diffraction light is incident thereon at a diffraction angle $\alpha_1$), can be placed substantially in the forward direction with respect to the computer-generated hologram H.

The same also goes for the v direction.

Thus, the computer-generated hologram H obtained on the basis of JP-A 11-296054 is designed such that when parallel light is vertically incident on the hologram plane from behind, the light is diffracted to the forward, another region ($u_0 \leq u \leq u_1'$ and $v_0' \leq v' \leq v_1'$) shifted from the forward given viewing region ($u_0 \leq u \leq u_1$ and $v_0 \leq v \leq v_1$), and when parallel light is obliquely incident on the hologram plane from behind, the light is diffracted to the forward given viewing region ($u_0 \leq u \leq u_1$ and $v_0 \leq v \leq v_1$).

From the thus found phase distribution $\phi_{HOLO}(x, y)$, the depth distribution of an actual hologram is found. When the hologram is of the reflection type, the aforesaid expression (7a) is used and when the hologram is of the transmission type, the aforesaid expression (7b) is used. A relief pattern having a depth $D(x, y)$ found for each minute cell having a lengthwise×breadthwise size $\Delta$ is formed on the surface of a hologram-forming resin layer, with a given reflective layer laminated thereon. The resultant hologram can be used as a hologram with enhanced effects, as is the case with the computer-generated hologram on the basis of JP-A 11-183716.

The phase distribution of the computer-generated hologram H may be calculated not only by the aforesaid methods themselves known so far in the art but also by other methods, e.g., one set forth in JP-A 47-6591.

If required, the found phase distribution may be optimized by suitable methods such as a hereditary algorithm or a simulated annealing method.

Reference is then made to the novel computer-generated hologram, herein referred to as (3), of the present invention, which can be seen in white at the desired viewing region.

The present invention provides a novel computer-generated hologram designed to diffuse light of a given reference wavelength incident thereon at a given angle of incidence in a specific angle range, wherein:

in a range of wavelengths including said reference wavelength wherein zero-order transmission light or zero-order reflection light incident on said computer-generated hologram at said angle of incidence is seen in white by additive color mixing, the maximum diffraction angle of incident light of the minimum wavelength in said range and incident at said angle of incidence is larger than the minimum diffraction angle of incident light of the maximum wavelength in said range and incident at said angle of incidence.

For the sake of simplicity, an account is now given of a transmission computer-generated hologram. However, it is noted that the present invention can also be applied to a reflection computer-generated hologram.

FIGS. 7(a) and 7(b) are conceptual representations illustrative of how a narrow viewing region set for a computer-generated hologram H changes with wavelengths.

Here assume that the reference wavelength $\lambda_{STD}$ of illumination light is between the minimum wavelength $\lambda_{MIN}$ and the maximum wavelength $\lambda_{MAX}$. The computer-generated hologram H is designed with respect to the reference wavelength $\lambda_{STD}$.

As shown in FIG. 7(a), consider the case where illumination light 3 entering the computer-generated hologram H at the reference wavelength $\lambda_{STD}$ and a certain oblique angle $\theta$ (which is an angle from the normal to the hologram H with the proviso that the counterclockwise angle is positive) spreads as diffraction light $5_{STD}$ in an angle range of $\beta_{1STD}$ to $\beta_{2STD}$ in the vicinity of the front. Numerical subscripts 1 and 2 indicate the minimum diffraction angle and the maximum diffraction angle, respectively. It is appreciated that the minimum diffraction angle is the diffraction angle of diffraction light that makes the minimum angle with zero-order transmission light and the maximum diffraction angle is the diffraction angle of diffraction light that makes the maximum angle with the zero-order transmission light. As illumination light 3 of the minimum wavelength $\lambda_{MIN}$ enters the hologram H at the same oblique angle $\theta$, a viewing region (the angle range of $\beta_{1MIN}$ to $\beta_{2MIN}$) to receive diffraction light $5_{MIN}$ is shifted to a lower side (the zero-order transmission light side) as compared with the incidence of the reference wavelength $\lambda_{STD}$, as shown in FIG. 7(a), because the computer-generated hologram H is taken as being a cluster of phase diffraction gratings. As illumination light 3 of the maximum wavelength $\lambda_{MAX}$ enters the hologram H at the same angle of incidence $\theta$, on the other hand, a viewing region (the angle range of $\beta_{1MAX}$ to $\beta_{2MAX}$) to receive diffraction light $5_{MAX}$ is shifted to an upper side (the side opposite to the zero-order transmission light side) as compared with the incidence of the reference wavelength $\lambda_{STD}$, as shown in FIG. 7(c).

It is here noted that such a distribution of diffraction light as mentioned above is found within a plane including the normal to the hologram H and the illumination light 3. Within a plane including the normal to the hologram H and perpendicular to that plane, however, diffraction light is distributed on both sides of the illumination light 3.

In the absence of any region where all diffraction light $5_{MIN}$, $5_{STD}$ and $5_{MAX}$ overlap one another as shown in FIG. 8, there is then no region to be viewed in white; the color to be viewed changes with viewing positions (angles).

FIGS. 9(a), 9(b) and 9(c) are illustrative of how a wide viewing region set for a computer-generated hologram H changes with wavelengths.

Upon the incidence of the minimum and maximum wavelengths $\lambda_{MIN}$ and $\lambda_{MAX}$ (FIGS. 9(b) and 9(c)), the viewing regions (the angle ranges of $\beta_{1MIN}$ to $\beta_{2MIN}$ and $\beta_{1MAX}$ to $\beta_{2MAX}$) are shifted to a lower and an upper side, respectively, as compared with the incidence of the reference wavelength $\lambda_{STD}$, upon incidence of the minimum and maximum wavelengths $\lambda_{MIN}$ and $\lambda_{MAX}$, as in the case of the narrow viewing region of FIGS. 7(a) to 7(c). However, the viewing region is so wide that when the hologram is viewed in the vicinity 6 of the front where all diffraction light $5_{MIN}$, $5_{STD}$ and $5_{MAX}$ overlap one another, all the wavelengths can be observed at the same time.

Accordingly, as long as the viewer moves within such a region, there is no substantial change in the color to be viewed.

The condition for setting the region 6 where all the assumed wavelengths can be viewed is that, as can be seen from FIG. 10, the maximum diffraction angle $\beta_{2MIN}$ of the minimum wavelength $\lambda_{MIN}$ in the assumed wavelength range is larger than the minimum diffraction angle $\beta_{1MAX}$ of the maximum wavelength $\lambda_{MAX}$. When the diffraction light $5_{MIN}$, $5_{STD}$ and $5_{MAX}$ are distributed with respect to the zero-order diffraction light on the opposite side to that shown in FIGS. 7 to 10, this relation is reversed; on the basis of the zero-order diffraction light, the maximum diffraction angle $\beta_{2MIN}$ of the minimum wavelength $\lambda_{MIN}$ with respect to the zero-order transmission light is larger than the minimum diffraction angle $\beta_{1MAX}$ of the maximum wavelength $\lambda_{MAX}$.

The sufficient condition for allowing all the wavelengths to overlap one another so that they can be viewed in white is that $\lambda_{MIN}$=450 nm and $\lambda_{MAX}$=650 nm. As far as at least the computer-generated hologram H with the maximum diffraction angle $\beta_{2MIN}$ of the minimum wavelength $\lambda_{MIN}$=450 nm being larger than the minimum diffraction angle $\beta_{1MAX}$ of the maximum wavelength $\lambda_{MAX}$=650 nm is concerned, the hologram H can thus be viewed in white yet with no color change in the region 6.

From the foregoing, it is understood that for viewing all the desired wavelengths in a certain viewing region, what is needed is only the determination of the viewing region $\lambda_{1STD}$ to $\lambda_{2STD}$ for the reference wavelength $\lambda_{STD}$ according to the following steps.

At step (a), the angle of incidence $\theta$ of the reconstructing illumination light 3 is determined.

At step (b), the range 6 of the desired viewing angle at which the hologram is seen in white is determined. That is, the minimum diffraction angle $\gamma_1$ (=$\beta_{1MAX}$) to the maximum diffraction angle $\gamma_2$ (=$\beta_{2MIN}$) is determined. It is here noted that the minimum diffraction angle $\gamma_1$ and the maximum diffraction angle $\gamma_2$ are defined for the zero-order transmission light. In the distribution of FIGS. 7 to 10, $\theta < \gamma_1 \leq \gamma_2$, and in the distribution opposite to that of FIGS. 7 to 10, $\theta > \gamma_1 \geq \gamma_2$.

At step (c), the desired viewing wavelength is determined (the minimum wavelength $\lambda_{MIN}$ to the maximum wavelength $\lambda_{MAX}$).

At step (d), the reference wavelength $\lambda_{STD}$ is determined in the range of $\lambda_{MIN} \leq \lambda_{STD} \leq \lambda_{MAX}$.

At step (e), using the following expression (9) on the basis of the fundamental expression (8) for diffraction gratings, the minimum diffraction angle $\beta_{1STD}$ at the reference wavelength $\lambda_{STD}$ is found from the minimum diffraction angle $\gamma_1$ and the maximum wavelength $\lambda_{MAX}$.

$$(\sin \gamma_1 - \sin \theta)/\lambda_{MAX} = (\sin \beta_{1STD} - \sin \theta)/\lambda_{STD}$$
$$\sin \beta_{1STD} = \sin \theta + (\sin \gamma_1 - \sin \theta) \times \lambda_{STD}/\lambda_{MAX} \quad (9)$$

At step (f), using the following expression (10) on the basis of the fundamental expression (8) for diffraction gratings, the maximum diffraction angle $\beta_{2STD}$ at the reference wavelength $\lambda_{STD}$ is likewise found from the maximum diffraction angle $\gamma_2$ and the minimum wavelength $\lambda_{MIN}$.

$$(\sin \gamma_2 - \sin \theta)/\lambda_{MIN} = (\sin \beta_{2STD} - \sin \theta)/\lambda_{STD}$$
$$\sin \beta_{2STD} = \sin \theta + (\sin \gamma_2 - \sin \theta) \times \lambda_{STD}/\lambda_{MAX} \quad (10)$$

Then, a computer-generated hologram 1 is fabricated on the basis of JP-A 11-183716 or JP-A 11-296054 in such a way that the minimum diffraction angle $\beta_{1STD}$ and the maximum diffraction angle $\beta_{2STD}$ are obtainable at the angle of incidence $\theta$ of illumination light and the reference wavelength $\lambda_{STD}$, thereby obtaining a diffuse hologram wherein the wavelengths $\lambda_{MIN}$ to $\lambda_{MAX}$ can be viewed at the angle of incidence $\theta$ of the reconstructing light illumination 3 in the viewing angle range of $\gamma_1$ to $\gamma_2$ and so the hologram 1 can be seen in white.

Reference has been made to how to find the diffraction angle range of $\beta_{1STD}$ to $\beta_{2STD}$ used for calculations when the desired angle of incidence $\theta$ of illumination light, the diffraction range of $\gamma_1$ to $\gamma_2$ and the wavelength range of $\lambda_{MIN}$ to $\lambda_{MAX}$ are provided.

On the other hand, the condition for setting a region wherein, when the minimum diffraction angle $\beta_{1STD}$ and the maximum diffraction angle $\beta_{2STD}$ are provided with respect to the reference wavelength $\lambda_{STD}$ and the angle of incidence $\theta$ of illumination light, all light of the wavelength range of $\lambda_{MIN}$ to $\lambda_{MAX}$ can be simultaneously viewed and seen in white is given as follows, using the minimum diffraction angle $\beta_{1MAX}$=$\gamma_1$ of the maximum wavelength $\lambda_{MAX}$ and the maximum diffraction angle $\beta_{2MIN}$=$\gamma_2$ of the minimum wavelength $\lambda_{MIN}$.

(1) In the case where diffraction light exists on a positive side with respect to the zero-order transmission light (FIG. 7 to FIG. 10), $$\gamma_2 \geq \gamma_1$$
$$\sin \gamma_2 \geq \sin \gamma_1$$

From expressions (9) and (10)

$$\sin \theta + (\sin \beta_{2STD} - \sin \theta) \times \lambda_{MIN}/\lambda_{STD} \geq \sin \theta + (\sin \beta_{1STD} - \sin \theta) \times \lambda_{MAX}/\lambda_{STD}$$
$$(\sin \beta_{2STD} - \sin \theta)/\lambda_{MIN} \geq (\sin \beta_{1STD} - \sin \theta) \times \lambda_{MAX}$$

Since $\sin \beta_{2STD} > \sin \theta$ $$\lambda_{MIN}/\lambda_{MAX} \geq (\sin \beta_{1STD} - \sin \theta)/(\sin \beta_{2STD} - \sin \theta) \quad (11)$$

(2) In the case where diffraction light exists on a negative side with respect to the zero-order transmission light (opposite to FIG. 7 to FIG. 10), $$\gamma_2 \leq \gamma_1$$
$$\sin \gamma_2 \leq \sin \gamma_1$$

From expressions (9) and (10)

$$\sin \theta + (\sin \beta_{2STD} - \sin \theta) \times \lambda_{MIN}/\lambda_{STD} \leq \sin \theta + (\sin \beta_{1STD} - \sin \theta) \times \lambda_{MAX}/\lambda_{STD}$$
$$(\sin \beta_{2STD} - \sin \theta)/\lambda_{MIN} \leq (\sin \beta_{1STD} - \sin \theta) \times \lambda_{MAX}$$

Since $\sin \beta_{2STD} < \sin \theta$ $$\lambda_{MIN}/\lambda_{MAX} \geq (\sin \beta_{1STD} - \sin \theta)/(\sin \beta_{2STD} - \sin \theta) \quad (11)$$

Thus, expression (11) holds irrespective of whether the diffraction light is on the positive side or on the negative side.

This expression (11) means that if the diffraction angle range of $\beta_{1STD}$ to $\beta_{2STD}$ at a certain reference wavelength $\lambda_{STD}$ is set in such a way as to meet expression (11) when the angle of incidence $\theta$ of illumination light and the desired viewing wavelength range of $\lambda_{MIN}$ to $\lambda_{MAX}$ are provided, there is then a range of $\gamma_1$ to $\gamma_2$ where all wavelengths within the desired viewing wavelength range of $\lambda_{MIN}$ to $\lambda_{MAX}$ can be simultaneously viewed.

Transformation of expression (11) gives $$\sin \theta \geq (\lambda_{MAX} \sin \beta_{1STD} - \lambda_{MIN} \sin \beta_{2STD})/(\lambda_{MAX} - \lambda_{MIN}) \quad (12)$$

This expression (12) means that only when the angle of incidence $\theta$ of illumination light is set in such a way as to meet expression (12) where the desired viewing wavelength range of $\lambda_{MIN}$ to $\lambda_{MAX}$ and the diffraction angle range of $\beta_{1STD}$ to $\beta_{2STD}$ at a certain reference wavelength $\lambda_{STD}$ are provided, there is a range of $\gamma_1$ to $\gamma_2$ where all wavelengths within the desired viewing wavelength range of $\lambda_{MIN}$ to $\lambda_{MAX}$ can be simultaneously viewed.

The foregoing discussions have held true only for the plane including the normal to the computer-generated hologram H and illumination light 3. Within a plane including the normal to the computer-generated hologram H and perpendicular to the aforesaid plane, a distribution range at the minimum wavelength $\lambda_{MIN}$ provides a region that can be viewed in white. This is because within this plane, diffraction light is distributed on both sides of illumination light. The range of this region may be determined by the transformation of the viewing region at the reference wavelength $\lambda_{STD}$, as mentioned above.

The technique for enabling the desired viewing region of the aforesaid computer-generated hologram H to be viewed in white may be used alone or in combination with the computer-generated hologram obtained on the basis of the aforesaid JP-A 11-187316 wherein the light entered obliquely from behind at the angle of incidence θ is diffracted toward the given forward viewing region or the computer-generated hologram obtained on the basis of JP-A 11-296054 wherein light entered obliquely from behind at the angle of incidence θ is diffracted toward the forward given viewing region and vertically incident light is diffracted toward another region shifted from the aforesaid given viewing region.

In any of the aforesaid cases (1) to (3), too, the depth D(x, y) is found for each minute cell having a breadthwise×lengthwise size Δ, using the aforesaid expressions 7(a) and 7(b), as already mentioned. On the basis of the results of this calculation, specific computer-generated holograms H can be obtained.

To be more specific, a reflection hologram conforms to expression 7(a). A blaze hologram conforms to D(x, y)=λ·φ (x, y)/4πn, and a sawtoothed (binary) hologram conforms to D(x, y)=λ·φ(x, y)(N−1)/4πn. Here n is the refractive index of the material forming a transparent plate and N is the number of steps in the sawtoothed hologram.

Figure 11:
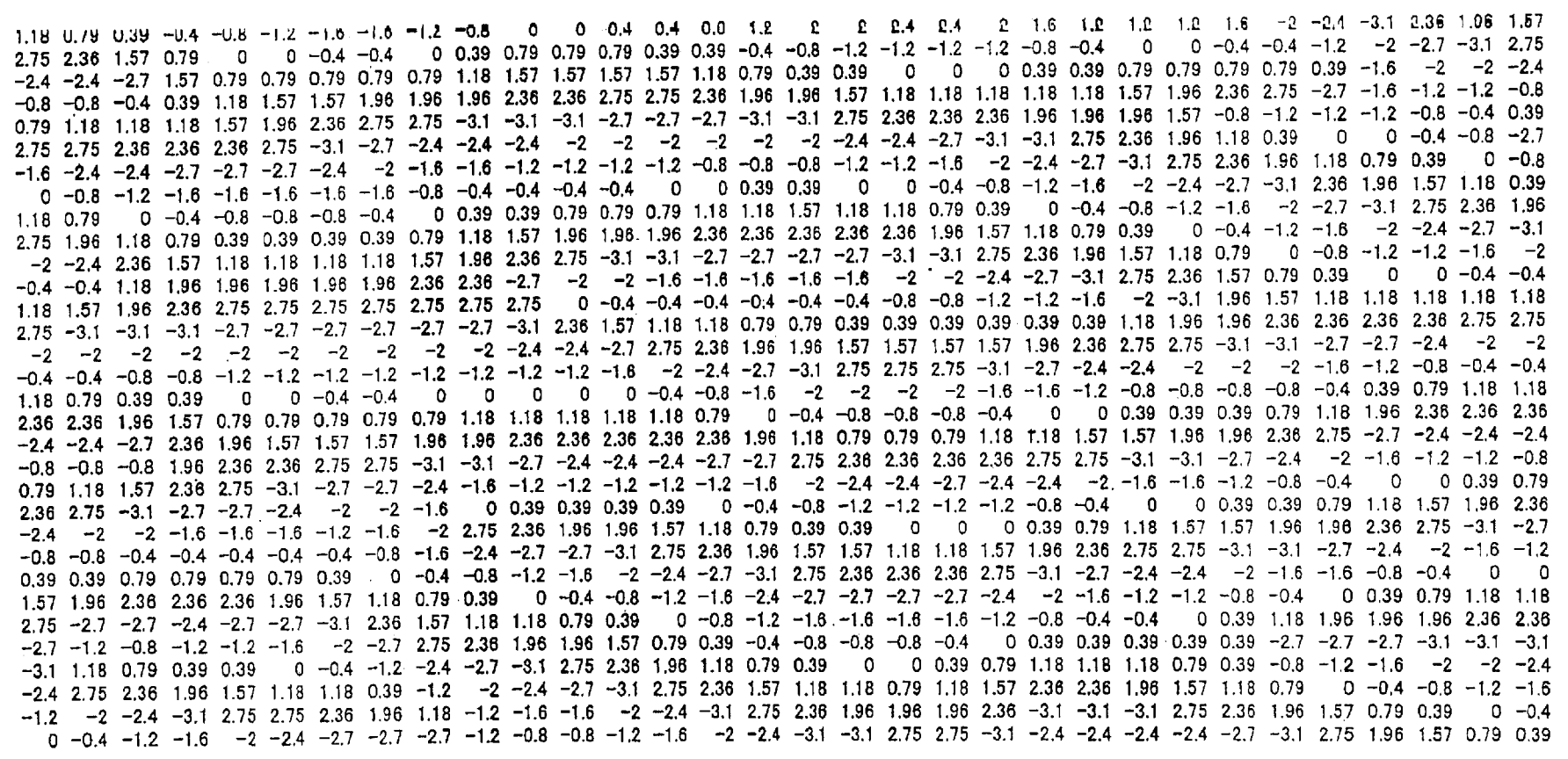
Figure 12:
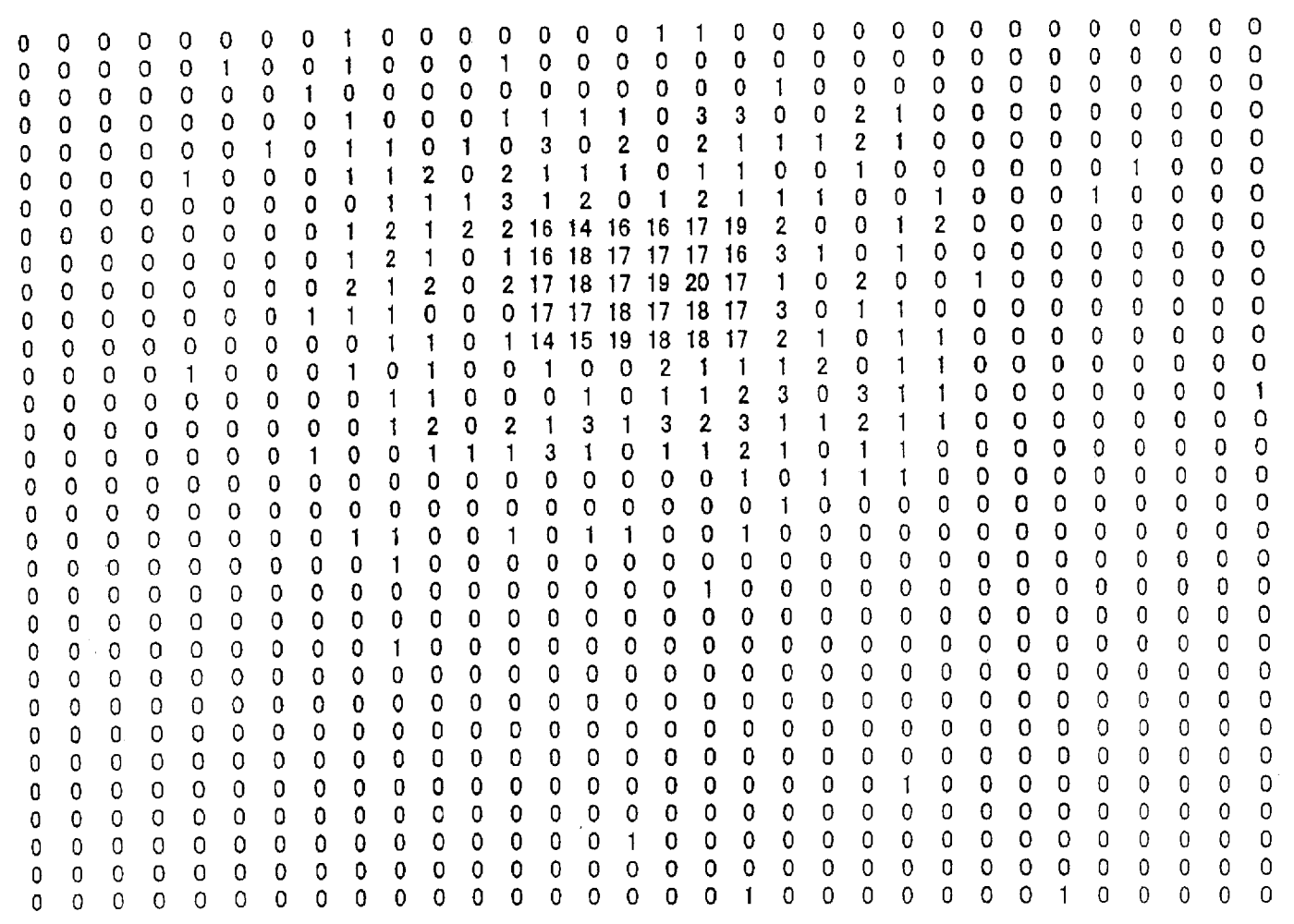

Reference is now made to one specific embodiment of the novel computer-generated hologram, herein referred to as (3), of the present invention, which can be viewed in white at the desired region. A computer-generated hologram H having such properties as shown in FIG. 10 is divided into 32×32 square cells, and a reconstruction plane for angle representation is divided into 32×32 square cells as well. In this embodiment, the hologram plane has a phase distribution $\phi_{HOLO}$ as shown in FIG. 11. In this computer-generated hologram H, the phase of each cell is quantized in 16 steps between −π and +π. On the basis of JP-A 11-296054, the computer-generated hologram H is assumed to be vertically illuminated with parallel light of 500 nm design wavelength. The then amplitude distribution $A_{IMG}$ at the reconstruction plane is shown in FIG. 12. Diffraction light is diffracted in the desired range of 6×5.

Figure 13:
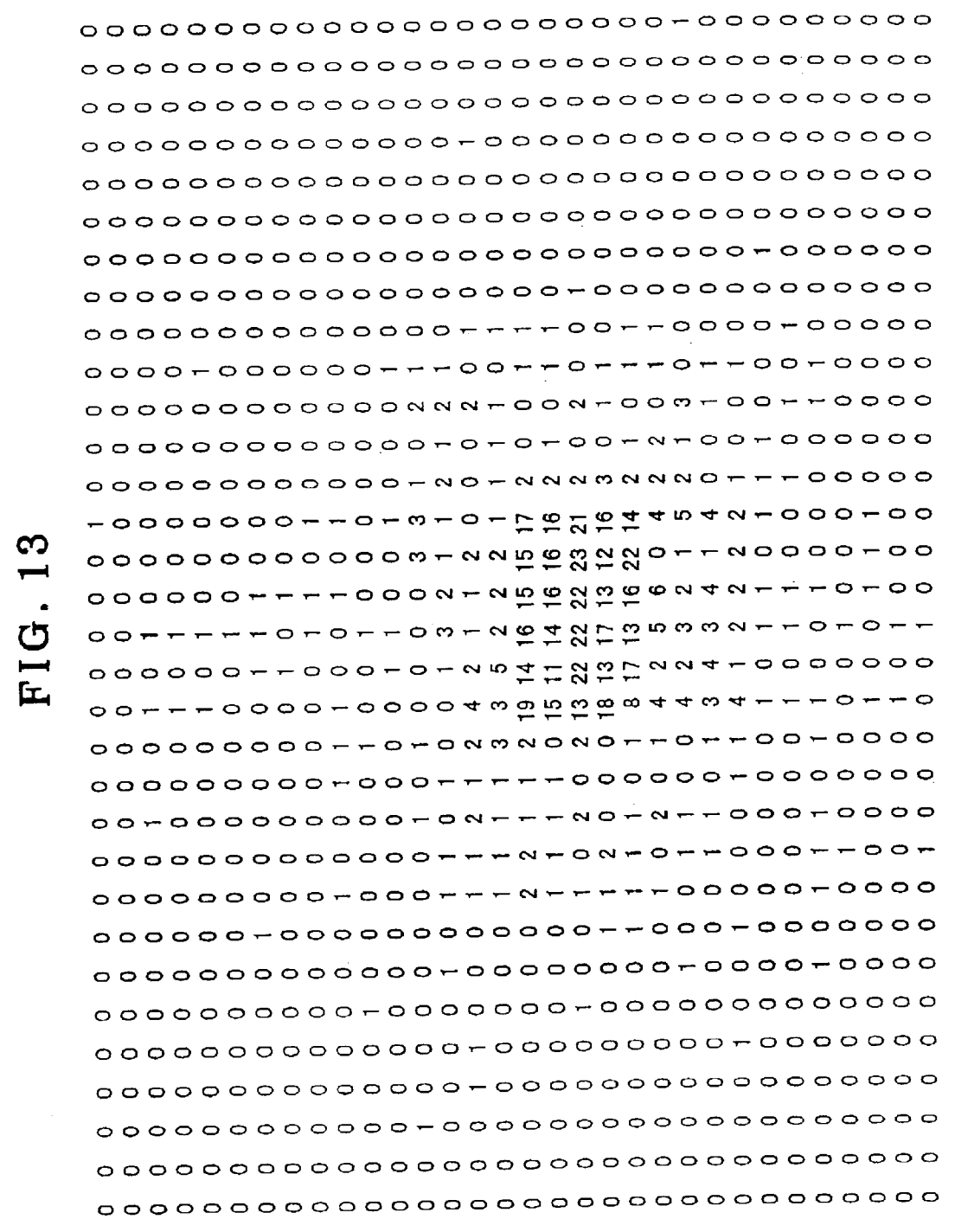

FIG. 13 shows an amplitude distribution $A_{IMG}$ at the reconstruction plane in the case of the reference wavelength $\lambda_{STD}$=500 nm, when the computer-generated hologram H is illuminated at a varied angle of incidence of θ=−35°. It is found that the diffraction light is distributed on a lower side as compared with the 0° incidence of FIG. 12.

Figure 14:
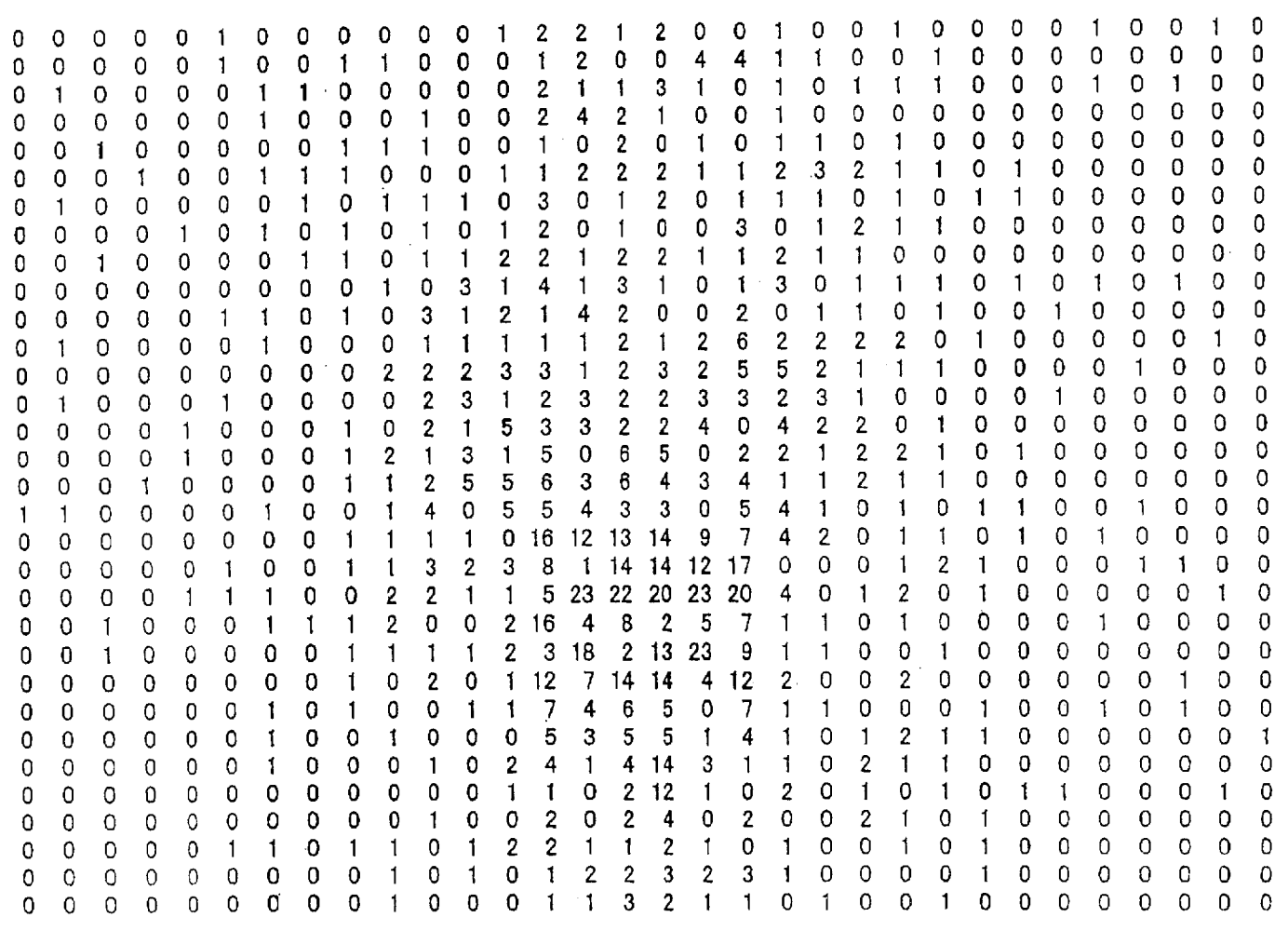

FIG. 14 shows an amplitude distribution $A_{IMG}$ at the reconstruction plane when the computer-generated hologram H is illuminated at an angle of incidence of θ=−35° and the minimum wavelength of $\lambda_{MIN}$=400 nm. It is seen that the diffraction light is distributed on a much lower side (the zero-order transmission light side) as compared with FIG. 13 at the reference wavelength of $\lambda_{STD}$=500 nm.

Figure 15:
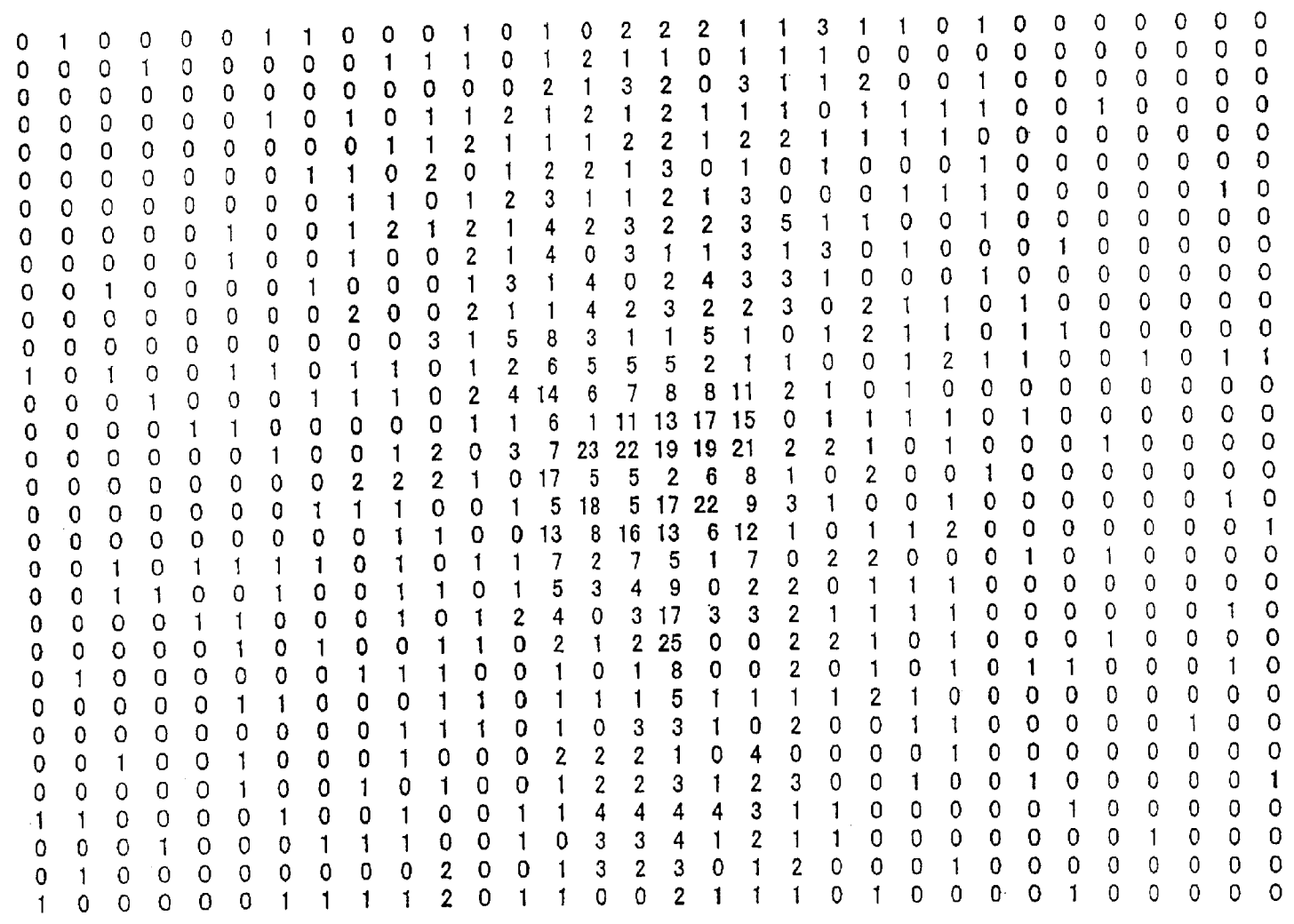

FIG. 15 shows an amplitude distribution $A_{IMG}$ at the reconstruction plane when the computer-generated hologram H is illuminated at an angle of incidence of θ=−35° and the maximum wavelength of $\lambda_{MAX}$=700 nm. It is seen that the diffraction light is distributed on an upper side (the side opposite to the zero-order transmission light side) as compared with FIG. 13 at the reference wavelength of $\lambda_{STD}$=500 nm.

Figure 16:
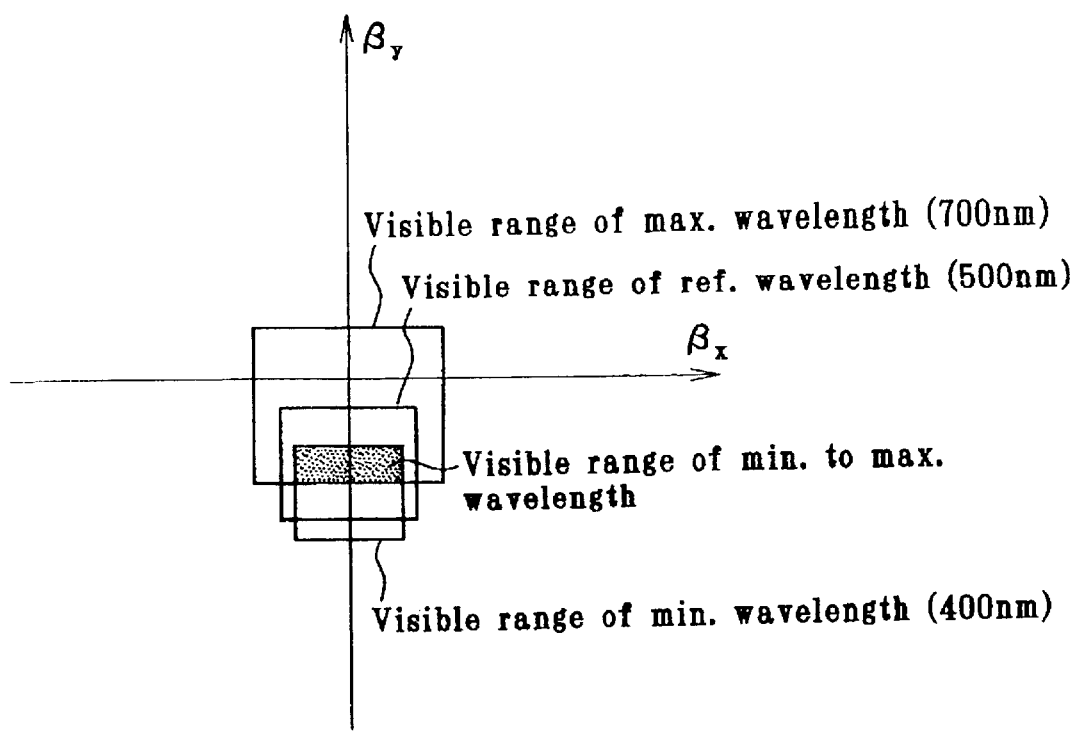
FIG. 16 is illustrative in schematic form of the superposition of visible regions that are the distribution range of diffraction light in FIGS. 13 to 15.

FIG. 16 is illustrative of the superposition in schematic form of visible regions defined by the distribution ranges of diffraction light in FIGS. 13 to 15. The diffraction angle in the longitudinal direction is indicated by $\beta_y$ and the diffraction angle in the transverse direction by $\beta_x$. As can be seen from FIG. 16, the visible region, in which light of all wavelengths in the wavelength range of 400 nm to 700 nm can be viewed in the longitudinal direction, is defined between the maximum diffraction angle of the minimum wavelength and the minimum diffraction angle of the maximum wavelength in the wavelength range. In the transverse direction, this visible region is defined by the diffraction angle range of the minimum wavelength.

It is noted that the aforesaid embodiment is provided only for the purpose of specifically showing that the computer-generated hologram H, herein referred to as (3), can be calculated. In other words, an order-of-magnitude number of cells must be calculated to construct an actual computer-generated hologram H.

The novel computer-generated hologram H, herein referred to as (3), of the present invention may be used by itself as a reflector which can be viewed in white at the desired viewing region.

Figure 17:
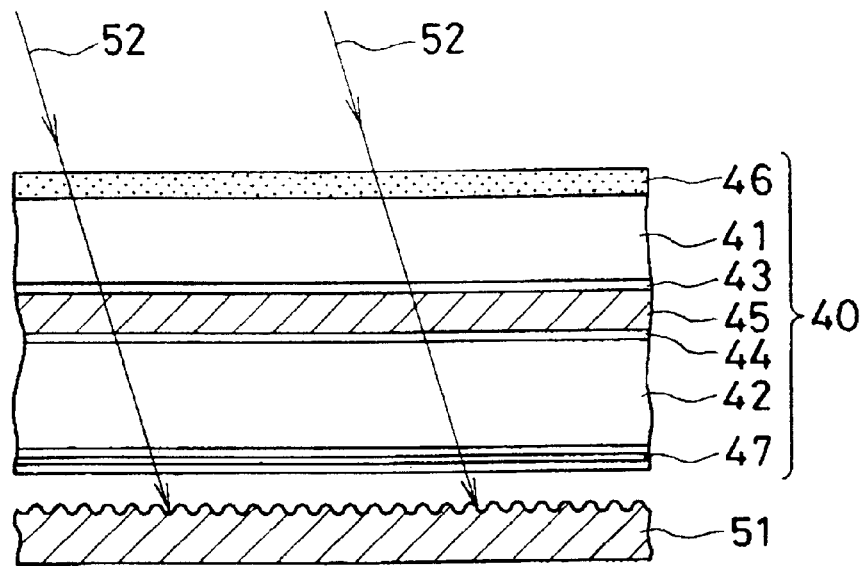
FIG. 17 is a sectioned representation showing the construction of one reflective LCD according to the invention.

If, as shown in FIG. 17 for the purpose of illustration alone, such a computer-generated hologram H is used as a reflective diffuser 51 for a reflective LCD, illumination light 52 incident on the LCD 40 from its display side is diffused and reflected to only the given viewing region in the front, so that bright yet white displays can be presented in a bright place without recourse to any spontaneous emission type backlight. Referring to FIG. 17, the LCD 40 comprises a twisted nematic or other liquid crystal layer 45 sandwiched between two glass plates 41 and 42. One glass plate 42 is provided on its inner surface with a uniform opposite electrode 44 while another glass substrate 41 is provided on its inner surface with a transparent display electrode 43 independent for each pixel and a black matrix (not shown). Referring here to a color display, another glass plate 42 is provided on its inner surface with a transparent display electrode 43, a color filter and a black matrix independent for each of liquid crystal cells R, G and B. On the sides of the electrodes 43 and 44 opposite to the liquid crystal layer 45, there are provided orientation layers, although not illustrated. A polarizing plate 46 is applied over the outer surface of the glass plate 41 on the viewing side and a polarizing plate 47 is applied over the outer surface of the glass plate 42 facing away from the viewing side, for instance, with their transmission axes intersecting at right angles. By controlling voltage applied between the transparent display electrode and the transparent opposite electrode in such an LCD 40, thereby varying the transmission state, it is possible to selectively display numerals, characters, symbols, patterns, etc. In this case, the reflective diffuser 51 comprises the computer-generated hologram H, herein referred to as (3), wherein a reflective layer is laminated on a relief pattern having a depth D(x, y) found by expression (7a) for each minute cell having a breadthwise×lengthwise size A. The reflective diffuser 51 is disposed on the side of the LCD 40 facing away from its viewing side. Illumination light 52 incident on the display side of the LCD 40 and including the desired viewing wavelength range of $\lambda_{MIN}$ to $\lambda_{MAX}$ is diffused and reflected by this reflective diffuser 51 in the forward direction, so that white displays can be presented in a bright place without recourse of any spontaneous emission type backlight.

Figure 18:
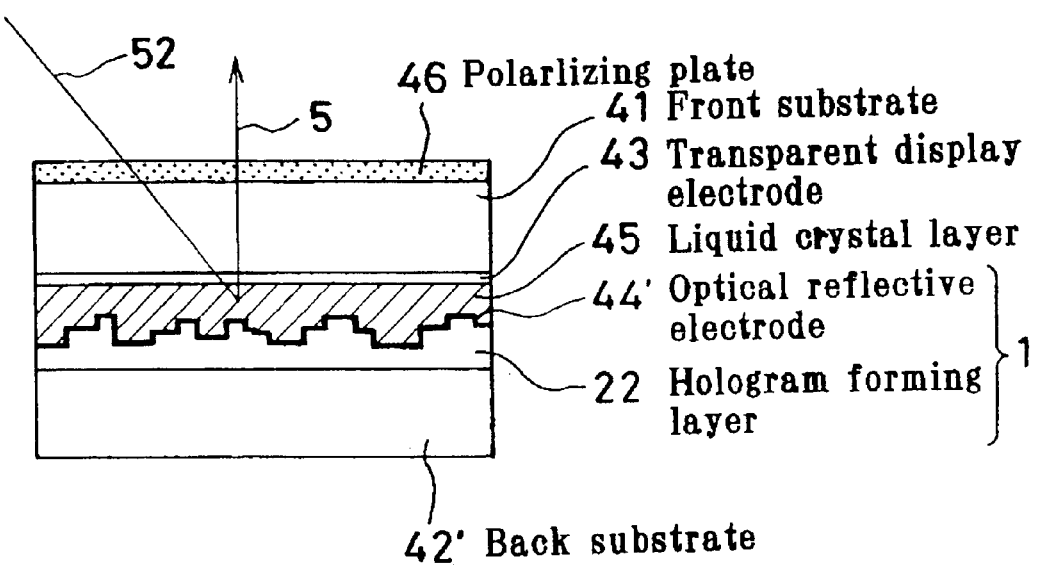
FIG. 18 a sectioned representation showing the construction of another reflective LCD to which the computer-generated hologram reflector of the invention is applied.
Figure 19A:
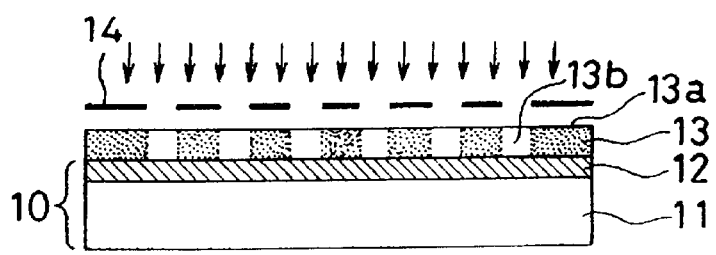
FIGS. 19(a) to 19(d) are illustrative of the photosteps for fabricating a hologram relief pattern substrate.
Figure 19B:
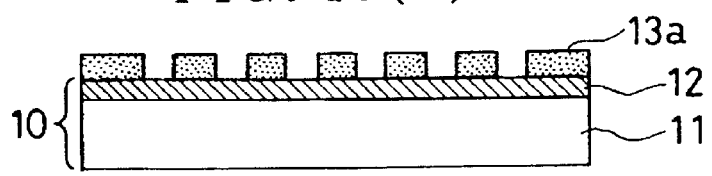
Figure 19C:
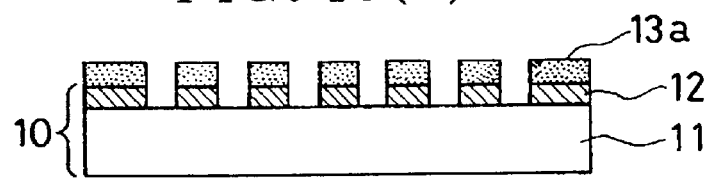
Figure 19D:
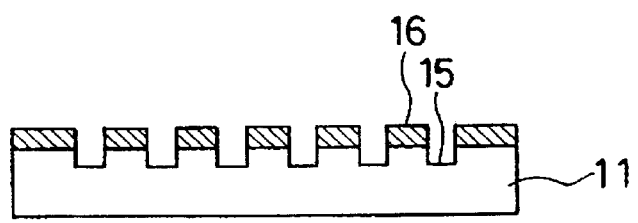

The novel computer-generated hologram H of the present invention, herein referred to as (3), may be disposed as a reflector between the liquid crystal layer 45 and a back substrate 42' in the reflective LCD, as shown in FIG. 18. In this case, the reflective layer 51 of the computer-generated hologram H also serves as an optical reflective electrode 44'.

While the novel computer-generated hologram H of the present invention, herein referred to as (3), may be used by itself as a computer-generated hologram, it is understood that the hologram H may be used as the elemental hologram pieces 2, 2a–2c of the computer-generated hologram H shown in FIGS. 1 and 2, wherein the elemental hologram pieces 2, 2a–2c are closely arranged.

One embodiment of how to form on a substrate a relief pattern preferable to replicate a single computer-generated hologram or a computer-generated hologram with elemental hologram pieces arranged closely (both hereinafter referred to as a computer-generated hologram 1) is now explained with reference to FIGS. 19(a) to 19(d) that show together one embodiment of forming on a substrate a relief pattern preferable to replicate the computer-generated hologram 1. In this embodiment, process steps for fabricating photomasks for semiconductor circuit fabrication, photomask blanks, and lithography systems such as laser or electron beam lithography systems may be used.

When such a lithography system is used for the computer-generated hologram 1 wherein the same elemental hologram pieces 2 are arranged, loads on the data processing by the lithography system can be greatly alleviated by imparting to the lithography system the matrix pitch necessary for the data on and array of the elemental hologram pieces 2. Loads on calculations for obtaining data on the elemental hologram pieces 2, too, can be greatly reduced as compared with those for the entire computer-generated hologram 1. As already mentioned, if the computer-generated hologram 1 has a size of 5 cm×5 cm and each elemental hologram piece 2 has a size of 250 μm×250 μm, the data concerning the elemental hologram piece 2, in area ratio parlance, accounts for barely 1/40,000 of the data on the entire computer-generated hologram 1.

First, a photomask blank 10 is obtained by laminating a low surface-reflective chromium thin film 12 on a synthetic quartz or other substrate 11 having a size of 15 cm×15 cm and a thickness of 6.4 mm. A resist layer 13 (of the positive type in the illustrated embodiment) resistant to dry etching is provided on the chromium thin film 12 to form a thin film of about 400 nm in thickness as an example. One material for the dry etching resist is ZEP 7000, Nippon Zeon Co., Ltd. The resist layer 13 may be laminated on the chromium thin film 12 by spin coating using a spinner or the like.

The resist layer 13 is then subject to pattern exposure, using a mask 14 as shown in FIGS. 19(a) to 19(d). Alternatively, this pattern exposure may be carried out using a laser lithography system for laser scanning or an electron beam lithography system for electron beam scanning. For instance, MEBES 4500 made by ETEC may be used as the electron beam lithography system.

By exposure, an easy-to-dissolve portion 13b with cured resist resin, and an unexposed portion 13a are separately formed. The easy-to-dissolve portion 13b is removed by solvent development, e.g., spray development using a developer spray, thereby forming a resist pattern 13a.

It is noted here that a negative resist may be used and developer dipping may be used for development. At the subsequent step, not only dry etching but also wet dip etching may be used, and so the resist is not always limited to that resistant to dry etching.

Using the formed resist pattern 13a, resist-free portions of the chromium thin film 12 are dry etched away to leave the underlying quartz substrate 11 exposed.

Then, the exposed portions of the quartz substrate 11 are again dry etched. With the progress of etching, a pit 15 is formed along with a projection having the chromium thin film 12 and resist thin film 13a in order from below.

Finally, the resist thin film is dissolved away or otherwise removed to obtain a quartz substrate comprising a pit 15 formed by the etching of the starting quartz substrate and a projection 16 with the chromium thin film 12 laminated on the top.

This fabrication process itself gives only a binary relief pattern (a two-step relief pattern including the original quartz substrate surface plus one additional different level of surface). By repetition of the photoetching process comprising resist formation→pattern exposure→resist development-drying etching of chromium thin film dry etching of quartz substrate→resist removal, however, photoetching can be applied to the pit-and-projection pattern formed by the first photoetching. By control of etching depth, three levels of surfaces are obtained in addition to the surface of the original quartz substrate or a total of four levels of surfaces are achieved.

The resist used herein, for instance, may be an i-line resist based on novolak resin resistant to dry etching, which is provided in the form of an about 465 nm thick thin film. The exposure used herein, for instance, may be carried out using ALTA 3500 as a lithography system.

Figures 20A, 20B, 20C:
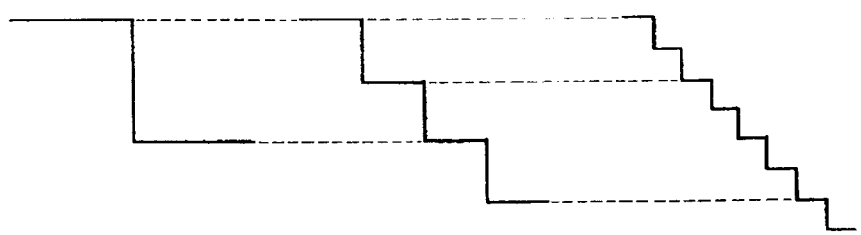
FIGS. 20(a), 20(b) and 20(c) are illustrative of the number of photoetching cycles and the number of steps in the relief.

FIGS. 20(a), 20(b) and 20(c) are illustrative of the number of repetition of the aforesaid photoething process and the number of steps produced thereby. FIG. 20(a) shows that two steps are produced by the first photoetching process. By repeatedly applying the photoetching process to the respective upper and lower steps of FIG. 20(a), four steps at the maximum are obtained, as shown in FIG. 20(b). By a total of three repetitions of the photoetching process, eight steps at the maximum are obtained as shown in FIG. 20(c).

Thus, steps corresponding in number to the $N_{PE}$-th power of 2 at the maximum are obtained at the number of repetition of photoetching, $N_{PE}$. It is here noted that the transcript PE stands for photoetching, and $N_{PE}$ is a natural number. Accordingly, the features of the fabrication process should preferably be determined in consideration of the relationships between the steps corresponding in number to the $N_{PE}$-th power of 2, i.e., two, four, eight, sixteen, . . . , steps and the number of repetition of photoetching, $N_{PE}$, although depending on the accuracy of the relief pattern and the performance of the obtained computer-generated hologram 1. Even when only one step is added to the number of steps corresponding to the $N_{PE}$-th power of 2, one additional photoetching process must be carried out. It is thus preferable to obtain steps equal or less in number to or than the $N_{PE}$-th power of 2.

After the given number of steps have been obtained in this way, the chromium thin film is wet etched away to obtain a relief pattern for the computer-generated hologram 1, wherein a pit-and-projection pattern with a given number of steps and a given depth is formed on the surface of the quartz substrate 11.

For the reproduction of phase distribution data, only re-calculations are needed. Still, such re-calculations are troublesome, and when the computer-generated hologram 1 of the present invention is used for the relief pattern, there is a chance of accidents such as abrupt contamination or breakdown of the computer-generated hologram 1.

It is thus preferable that for fabrication using this type of relief pattern, one or only a few patterns for replication purposes are fabricated from the first pattern. Then, this replication pattern is used to prepare the necessary number of patterns for fabrication (replication).

To increase the durability of the relief pattern, it is preferable to plate the surface of the relief pattern and then remove a metal-plated pattern therefrom.

Alternatively, the relief pattern may also be fabricated by subjecting a suitable substrate to mechanical engraving using a diamond needle or the like.

Figure 21A:
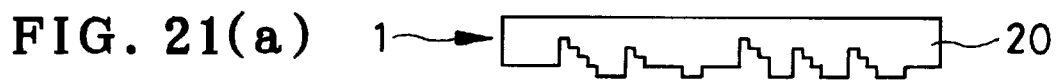
FIGS. 21(a) to 21(e) are illustrative of relief patterns and replicated holograms.

For processes for making a copy of the computer-generated hologram 1 using the relief pattern (or, preferably, the aforesaid pattern for fabrication), a process for pressing such a relief pattern 20 as shown in FIG. 21(a) against a resin layer that becomes soft by heating, an injection process or a casting process may be utilized. Either thermoplastic resins or thermosetting resins may be used with these processes.

Figure 21B:
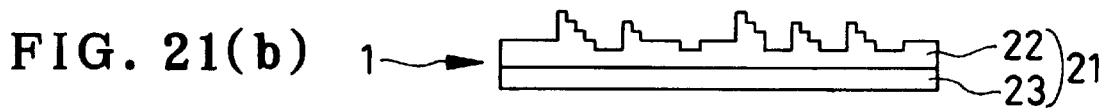

Preferably on an industrial scale, an uncured resin composition containing an ultraviolet curing resin is positioned in contact with the surface of the relief pattern 20 (the lower surface of the relief pattern in FIG. 21(a)). Then, a plastic film providing a substrate material is laminated on the other side of the resin composition to sandwich the resin composition between the relief pattern and the plastic film. The resin composition is cured by irradiation with ultraviolet radiation or other means. Finally, a hologram layer 22 comprising the resin layer that has been cured with the surface relief configuration of the relief pattern imparted thereto is released together with the plastic film 23 to obtain a laminate 21 (FIG. 21(b)). If required, the plastic film 23 may be released off after the curing of the resin composition (FIG. 21(c)).

Exemplary ultraviolet curing resins are thermosetting resins such as unsaturated polyester, melamine, epoxy, polyester (meth)acrylate, urethane (meth)acrylate, epoxy (meth)acrylate, polyether (meth)acrylate, polyol (meth)acrylate, melamine (meth)acrylate or triazine acrylate, or ionizing radiation curing resins obtained by adding radical polymerizable unsaturated monomers to these resins.

For the plastic film 23 providing the substrate material, it is preferable to use plastic films of excellent transparency and smoothness. For instance, polyethylene terephthalate films, polyethylene films, polypropylene films, polyvinyl chloride films, acrylic films, triacetyl cellulose films and cellulose acetate butylate films may be used, all having a thickness of 1 $\mu$m to 1 mm, and preferably 10 $\mu$m to 100 $\mu$m.

Figure 21C:
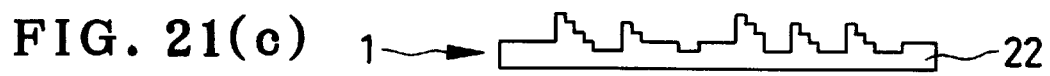
Figure 21D:
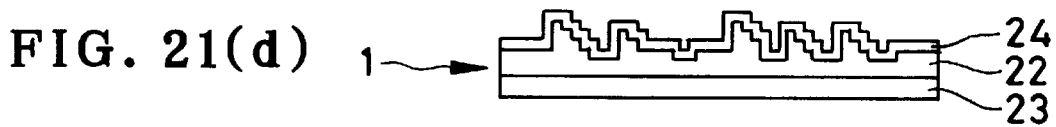
Figure 21E:
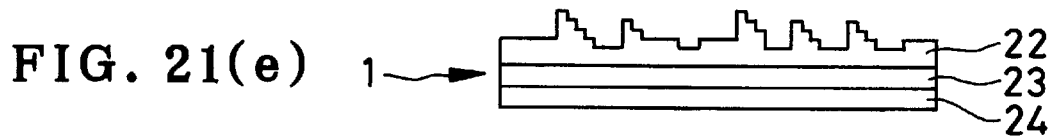

As shown in FIGS. 21(a) to 21(e), the laminate 21 copied from the relief pattern 20 with the hologram relief configuration transferred thereto may be used as such. To enhance the optical reflective function of the laminate 21, however, it is preferable to laminate an optical reflective layer 24 on the relief surface of the hologram layer 22 (FIG. 21(d)) or the lower surface of the plastic film 23. Alternatively, it is acceptable to laminate the optical reflective layer 24 on the non-relief surface of the hologram 22 (see FIG. 21(e)) when no plastic film is used as shown in FIG. 21(c).

For the optical reflective layer 24, two types of reflective layers, i.e., a metal reflective layer formed of a metal thin film opaque to light or the like (which layer shows transparency at a very small thickness), and a transparent reflective layer which is transparent to light and has a refractive index different from that of the hologram layer, may be used.

The metal reflective layer may be formed by sole or combined use of metals such as Cr, Fe, Co, Ni, Cu, Ag, Au, Ge, Al, Mg, Sb, Pb, Cd, Bi, Sn, Se, In, Ga and Rb, or oxides or nitrides thereof.

Of these, Al, Cr, Ni, Ag, and Au are most preferred.

When the optical reflective layer is formed of a metal thin film, it is preferable to use thin-film techniques such as vacuum evaporation, sputtering, and ion plating.

At a thickness of 200 Å or less, the reflective layer meets its own function although it has relatively high light transmittance and transparency as well.

Alternatively, the optical reflective layer may be formed of a continuous thin film of material having a refractive index different from that of the hologram layer 22. The continuous thin film has a thickness small enough to make a thin-film forming material transparent, but should preferably have a thickness of usually 100 to 1,000 Å. The continuous thin film may be formed on the relief surface by thin-film techniques such as vacuum evaporation, sputtering, and ion plating. The continuos thin film may have a refractive index lower or higher than that of the hologram layer 22; however, the difference in refractive index between both should be preferably at least 0.3, more preferably at least 0.5, and even more preferably at least 1.0.

A continuous thin film having a refractive index higher than that of the hologram layer 22 may be formed of ZnS, $TiO_2$, $Al_2O_3$, $Sb_2S_3$, SiO, Tio, $SiO_2$ or the like. A continuous thin film having a refractive index lower than that of the optical diffractive structure layer may be formed of LiF, $MgF_2$, $AlF_3$ or the like. In addition, transparent synthetic resins having a refractive index different from that of the optical diffractive structure layer, for instance, polytetrafluoroethylene, polychlorotrifluoroethylene, polyvinyl acetate, polyethylene, polypropylene and polymethyl methacrylate may be used for the optical reflective layer.

It is here noted that if innumerable fine pores are provided by laser lithography or other suitable means through the optical reflective layer formed as a metal reflective layer (which itself is opaque to light), it is then possible to ensure light transmission simultaneously with optical reflectivity. Such a metal reflective layer may also be used for the present invention.

As shown in FIGS. 21(a) to 21(e), the computer-generated hologram 1 of the present invention is made up of the hologram layer 22 alone or the hologram laminate 21 comprising the hologram layer 22 and the plastic film 23. The optical reflective layer 24 may be laminated on the upper (relief) or lower surface of the hologram layer 22 or hologram laminate 21. These hologram products are all effectively applied to display devices, esp., LCD devices.

Figure 22A:
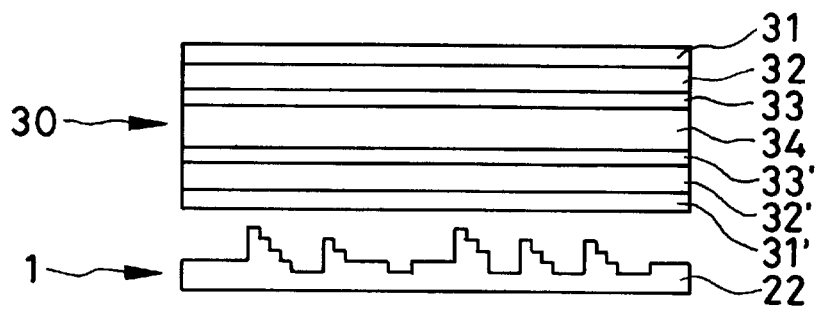
FIGS. 22(a) and 22(b) are illustrative of liquid crystal display devices to which the computer-generated holograms of the invention are applied.

FIG. 22(a) shows an embodiment wherein the computer-generated hologram 1 is applied to the non-viewing side of an LCD 30. The LCD 30 comprises, in order from its upper surface side, a polarizing plate 31, a glass substrate 32, a transparent electrode 33, a liquid crystal layer 34, a transparent electrode 33', a glass substrate 32' and a polarizing plate 31' which are laminated together. The computer-generated hologram 1 is disposed on the back side of the LCD 30. In FIG. 22(a), the computer-generated hologram 1 consisting of the hologram layer 22 alone is provided. However, it is noted that any one of the hologram products shown in FIGS. 21(a) to 21(d) may be used.

Figure 22B:
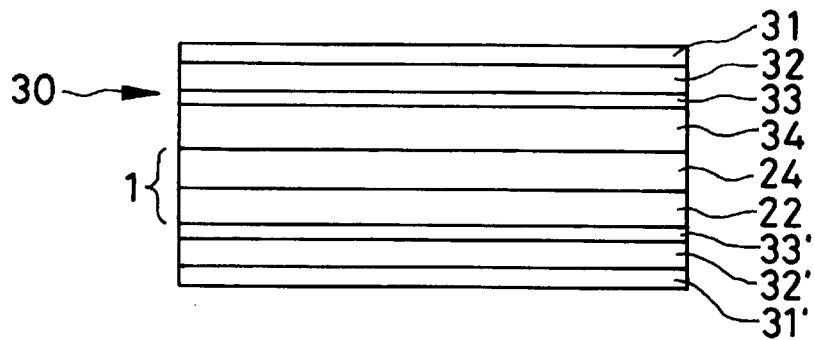

When the computer-generated hologram 1 is applied to an LCD, it may be applied between the liquid crystal layer 34 and the underlying back substrate. Alternatively, the computer-generated hologram 1 comprising the optical reflective layer 24 and hologram layer 22 may be disposed on the lower surface of the liquid crystal layer 34, as shown in FIG. 22(b).

As a matter of course, any one of the hologram products shown in FIGS. 21(b) to 21(e) may be used as the computer-generated hologram 1.

Reference is then made to a computer-generated hologram comprising a transparent plate material having a light refractive index higher than that of air and a blaze pattern of sawtoothed shape in section, which blaze pattern is disposed on the back surface of the transparent plate. The computer-generated hologram is designed in such a way that the depth d of the blaze is equivalent to a half wavelength or $d=\lambda/2n$ wherein $\lambda$ is the wavelength of reference light and n is the light refractive index of the transparent plate. This computer-generated hologram can provide solutions to prior art problems in conjunction with diffraction efficiency, master pattern fabrication and replication, and applications. Thus, the present invention provides such a computer-generated hologram as well as a reflector and a reflective LCD constructed using the same. In what follows, too, both such a computer-generated hologram and a computer-generated hologram wherein elemental hologram pieces are closely arranged will be referred to as the computer-generated hologram 1.

Figure 23A:
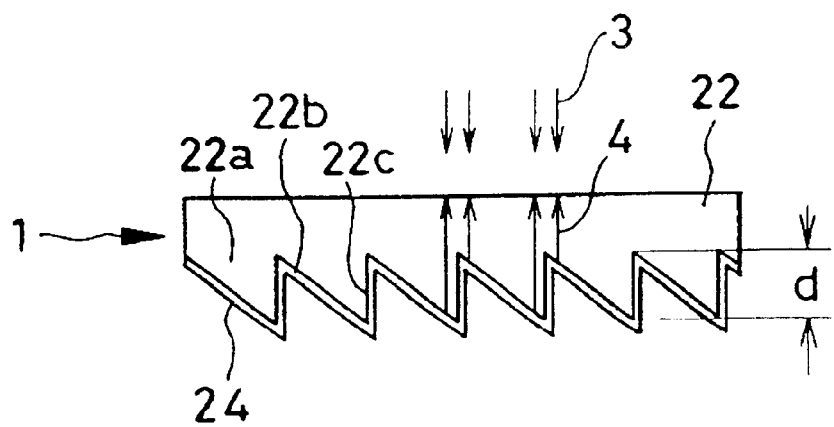
FIGS. 23(a) and 23(b) are illustrative in section of another computer-generated hologram of the invention.

Referring to FIG. 23(a), the computer-generated hologram 1 comprises a transparent plate and a hologram layer 22 having a blaze pattern 22a therefor, which layer is disposed on the lower surface of the transparent plate. The so-called blaze pattern 22a comprises a plurality of grooves of sawtoothed shape in section, each comprising a portion 22b slanting with respect to the transparent plate and a portion 22c vertical with respect to the transparent plate. As viewed in a vertical direction to the transparent plate, the blaze pattern has a depth d.

An optical reflective layer 24 is laminated on and along the blaze pattern 22a of the computer-generated hologram 1. Referring to FIG. 23(a), light 3 entered into the hologram 1 from above the paper is reflected at the interface between the hologram layer 22 and the optical reflective layer 24, as indicated at 4, emerging upward from the hologram 1.

The length of an optical path in the hologram layer 22 taken by the light entering and emerging from the computer-generated hologram 1 makes a difference of 2n times as much as the depth d of the blaze pattern (where n is the light refractive index of the medium, i.e., the transparent plate) at the maximum. When this difference in optical path length coincides with the wavelength $\lambda$ of the incident light, the diffraction efficiency reaches a maximum. Thus, $\lambda=2nd$ or $d=\lambda/2n$.

Figure 23B:
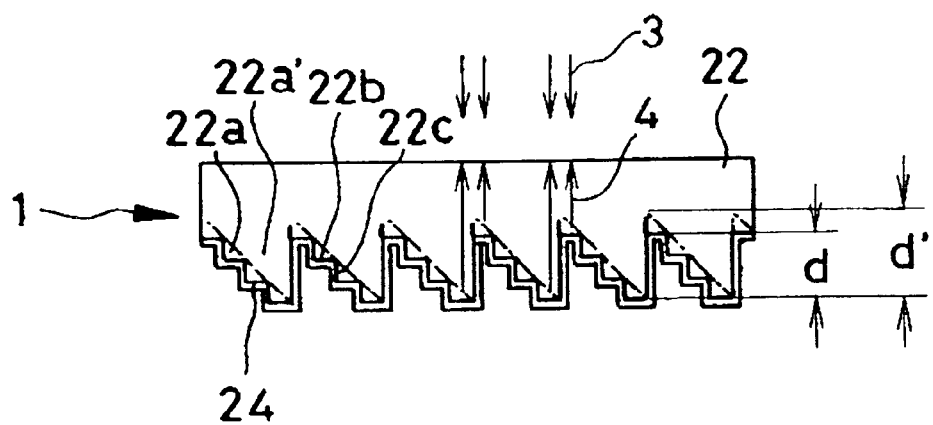

FIG. 23(b) illustrates another embodiment of the computer-generated hologram 1, wherein the section of each of grooves in a sawtoothed blaze pattern 22a does not have a sawtoothed configuration defined by smooth lines. In this embodiment, the oblique side of each sawtooth comprises a portion 22b parallel with a transparent plate and a portion 22c vertical to the transparent plate. Then, these portions 22b and 22c are repeatedly formed until 4 steps are obtained. This blaze pattern 22a is a so-called binary pattern. Here the number of steps (N) is the number of all steps having different heights, and the number of differences in level is N−1.

The blaze pattern 22a comprising a plurality of grooves, each formed stepwise, has a diffractive action equivalent to that of an assumed sawtoothed blaze pattern 22a' having a depth d', as shown by one-dotted lines in FIG. 23(b). In the case of the blaze pattern 22a', interference of light occurs when $\lambda=2nd'$. In other words, $d'=\lambda/2n$.

However, the actual depth d of each groove formed stepwise in the blaze pattern 22a of the computer-generated hologram is smaller than the assumed d' by one step or, for the assumed d', $d=d'\times\{(N-1)/N\}=(\lambda/2)\times\{(N-1)/N\}$. It follows that $d=\lambda(N-1)/2nN$.

With the sawtoothed blaze pattern provided in a stepwise form having N steps, a computer-generated hologram having an equivalent diffractive action is thus obtainable even when the groove depth d is 1/N smaller than that of the blaze pattern of smooth shape in section, as shown in FIG. 23(a).

In the computer-generated holograms of whether the blaze type or the binary type, the groove depth d is inversely proportional to the light refractive index, n, of the transparent plate forming part of the hologram layer 22. Therefore, if a material having a high light refractive index is used, it is then possible to decrease the groove depth d. For instance, a blaze type of computer-generated hologram fabricated using an acrylic resin having a light refractive index of 1.4 has a groove depth of d=500 nm/(2×1.4) or about 180 nm with the proviso that the reference wavelength is 500 nm.

Here consider the case where light is entered into the same blaze type of computer-generated hologram from below. Since the medium is air (n=1), d=500 nm/2=250 nm. That is, the groove depth increases by less than 40% as compared with the case where light is entered thereinto from above, and so a master blaze pattern is more difficult to fabricate and replicate.

For such computer-generated holograms as shown in FIGS. 23(a) and 23(b), any one of the aforesaid computer-generated holograms (1) to (3) may be used. In the computer-generated hologram (1), (2) or (3), one single hologram may be formed all over the surface. Alternatively, identical minute elemental hologram pieces may be closed arranged all over the surface (FIGS. 1 and 2).

Figure 24A:
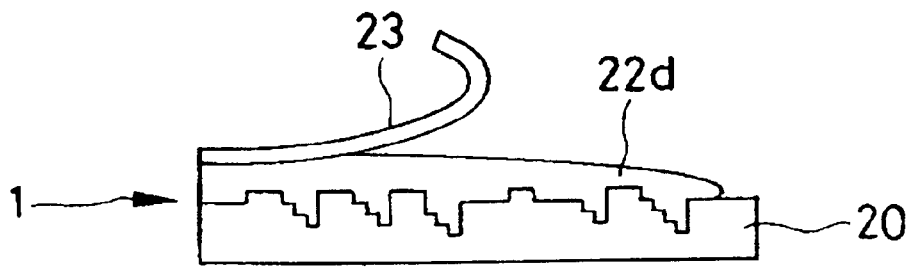
FIGS. 24(a) to 24(e) are illustrative of blaze patterns and replicated holograms.

For processes for making a copy of such a computer-generated hologram 1 as shown in FIG. 23(a) or 23(b) using the blaze pattern (or, preferably, the aforesaid pattern for fabrication), a process for pressing such a blaze pattern 20 as shown in FIG. 24(a) against a resin layer that becomes soft by heating, an injection process or a casting process may be utilized. Either thermoplastic resins or thermosetting resins may be used with these processes.

Preferably on an industrial scale, an uncured resin composition containing an ultraviolet curing resin is positioned in contact with the surface of the blaze pattern 20 (the lower surface of the relief pattern in FIG. 24(a)) by means of coating or the like. Then, a plastic film 23 providing a substrate material is put on the resin composition while care is taken to remove air bubbles, if any. Pressure is then applied on the plastic film 23 from above, using a roll or the like, to laminate the plastic film 23 on the blaze pattern surface with the required thickness of uncured resin composition layer 22d interposed between them.

While the uncured resin composition layer 22d is sandwiched between the surface of the blaze pattern 20 and the plastic film 23, the resin composition layer is cured by irradiation with ultraviolet radiation or other means to prepare a laminate 21 comprising a hologram layer 22 comprising the resin layer that has been cured with the surface blaze configuration of the blaze pattern imparted thereto. Thereafter, the laminate 21 is released from the blaze pattern 20 (FIG. 24(b)). If required, the plastic film 23 may be released off after the curing of the resin composition (FIG. 24(c)).

The "transparent plate" used herein is understood to refer to not only the hologram layer 22 alone but also the laminate 21 comprising the hologram layer 22 and plastic film 23.

Exemplary ultraviolet curing resins are thermosetting resins such as unsaturated polyester, melamine, epoxy, polyester (meth)acrylate, urethane (meth)acrylate, epoxy (meth) acrylate, polyether (meth)acrylate, polyol (meth)acrylate, melamine (meth)acrylate or triazine acrylate, or ionizing radiation curing resins obtained by adding radical polymerizable unsaturated monomers to these resins. It is here noted that curing may also be carried out using electron beams in place of ultraviolet radiation.

For the plastic film 23 providing the substrate material, it is preferable to use plastic films of excellent transparency and smoothness. For instance, transparent synthetic resin films such as polyethylene terephthalate films, polyethylene films, polypropylene films, polyvinyl chloride films, acrylic films, triacetyl cellulose films and cellulose acetate butylate films may be used, all having a thickness of 1 $\mu$m to 1 mm, and preferably 10 $\mu$m to 100 $\mu$m.

Figure 24B:
Figure 24C:

The laminate 21 (FIG. 24(b)) copied from the blaze pattern 20 with the hologram relief configuration transferred thereto or the hologram layer 22 free from the plastic film 23 (FIG. 24(c)) is used while the surface free from the hologram blaze pattern (the upper surface in FIGS. 24(b) and 24(c)) is utilized as the viewing side.

Figure 24D:
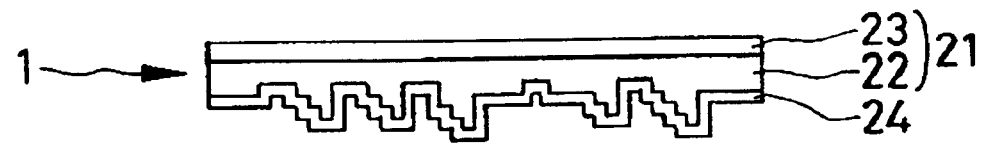
Figure 24E:

These may be used as such. To enhance the optical reflecting function, however, it is preferable to laminate an optical reflective layer 24 on the blaze surface of the hologram layer 22 (FIG. 24(d)).

For the optical reflective layer 24, two types of reflective layers, i.e., a metal reflective layer formed of a metal thin film opaque to light or the like (which layer shows transparency at a very small thickness), and a transparent reflective layer which is transparent to light and has a light refractive index different from that of the hologram layer, may be used.

The metal reflective layer may be formed by sole or combined use of metals such as Cr, Fe, Co, Ni, Cu, Ag, Au, Ge, Al, Mg, Sb, Pb, Cd, Bi, Sn, Se, In, Ga and Rb, or oxides or nitrides thereof. Of these, Al, Cr, Ni, Ag, and Au are most preferred.

When such a thin film is used to form the optical reflective layer on the blaze surface of the hologram layer, it is preferable to use thin film techniques such as vacuum evaporation, sputtering, and ion plating.

At a thickness of 200 Å or less, the reflective layer meets its own function although it has relatively low light transmittance and transparency as well.

Alternatively, the optical reflective layer may be a transparent reflective layer formed of a continuous thin film of material having a light refractive index different from that of the hologram layer 22.

The transparent reflective layer has a thickness small enough to make a thin-film forming material transparent, but should preferably have a thickness of usually 100 to 1,000 Å.

The transparent reflective layer may be formed on the blaze surface of the hologram layer by thin-film techniques such as vacuum evaporation, sputtering, and ion plating, as in the case of the metal reflective layer.

The transparent reflective layer may have a refractive index lower or higher than that of the hologram layer 22; however, the difference in refractive index between both should be preferably at least 0.3, more preferably at least 0.5, and even more preferably at least 1.0.

A continuous thin film having a refractive index higher than that of the hologram layer 22 may be formed of ZnS, $TiO_2$, $Al_2O_3$, $Sb_2S_3$, SiO, TiO, $SiO_2$ or the like. A continuous thin film having a refractive index lower than that of the hologram layer 22 may be formed of LiF, $MgF_2$, $AlF_3$ or the like.

In addition, transparent synthetic resins having a refractive index different from that of the hologram layer 22, for instance, polytetrafluoroethylene, polychlorotrifluoroethylene, polyvinyl acetate, polyethylene, polypropylene and polymethyl methacrylate may be used for the optical reflective layer. These resins, upon dissolved in solvents, may be laminated on the blaze surface of the hologram layer 22 by means of coating or the like.

It is here noted that if innumerable fine pores are provided by laser lithography or other suitable means through the optical reflective layer formed as a metal reflective layer (which itself is opaque to light), it is then possible to ensure light transmission simultaneously with optical reflectivity. Such a metal reflective layer may also be used as the optical reflective layer 24 the present invention.

When the optical reflective layer 24 is laminated on the blaze pattern side of the hologram layer 22, it is a prerequisite that light be refracted at the interface between the hologram layer 22 and the optical reflective layer; the optical reflective layer 24 be free from any lamination defects such as pinholes along the blaze pattern. As long as the optical reflective layer 24 has the required minimum thickness, slight thickness variations in the optical reflective layer 24 are acceptable. It is thus possible to alleviate loads on control in the process of fabricating the optical reflective layer 24.

Depending on whether or not the plastic film 23 and/or optical reflective layer 24 are provided, such a computer-generated hologram 1 as shown in FIG. 23(a) or 23(b) may comprise the hologram laminate 21 (FIG. 24(b)), the hologram layer 22 alone (FIG. 24(c)), and the hologram layer 22 with the optical reflective layer 24 laminated on the lower surface of the hologram layer 22. These hologram products are all effectively applied to display devices, esp., LCDs, while the blaze-free surface side of the hologram layer 22 is used as a viewing side.

Figure 25A:
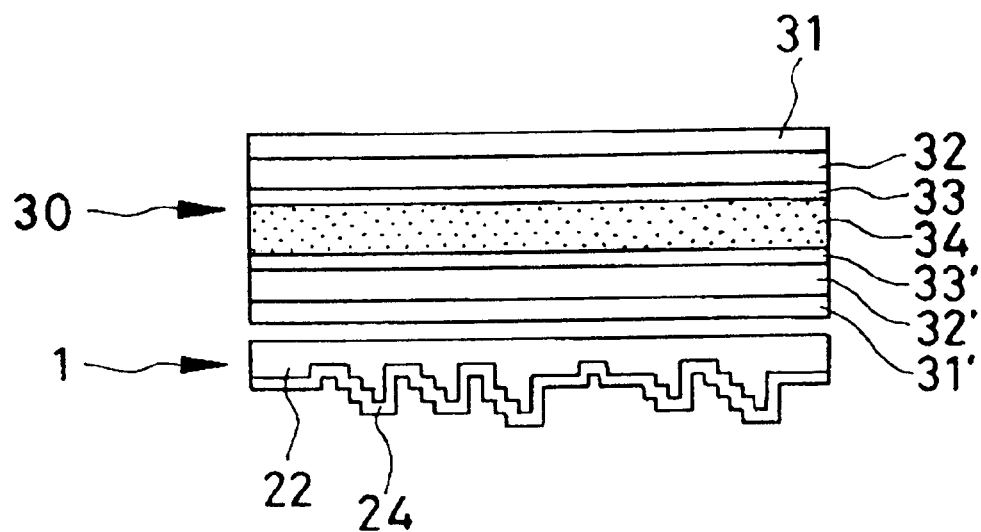
FIGS. 25(a) and 25(b) are illustrative of liquid crystal display devices to which the computer-generated holograms of the invention are applied.

FIG. 25(a) shows an embodiment of the present invention, wherein the computer-generated hologram 1 is applied to the non-viewing side of an LCD 30 that is a main pat of a liquid crystal display system. The LCD 30 comprises, in order from its upper surface side, a polarizing plate 31, a glass substrate 32, a transparent electrode 33, a liquid crystal layer 34, a transparent electrode 33', a glass substrate 32' and a polarizing plate 31' which are laminated together. The computer-generated hologram 1 is disposed on the back side of the LCD 30. In FIG. 25(a), the computer-generated hologram 1 made up of a hologram laminate consisting of the hologram layer 22 and optical reflective layer 24 is provided. However, it is noted that the aforesaid types of holograms may all be used.

As shown in FIG. 25(a), the computer-generated hologram 1 may be positioned parallel with and in contact with, not spaced away from, the LCD 30. Alternatively, the computer-generated hologram 1 may be laminated on the LCD 30 with an adhesive layer applied between the upper surface of the computer-generated hologram 1 and the polarizing plate 31'. Preferably in this case, the adhesive layer is previously laminated on the upper surface (the blaze pattern-free surface of the hologram layer) of the computer-generated hologram 1. It is then preferable to use an adhesive layer of high transparency.

Figure 25B:
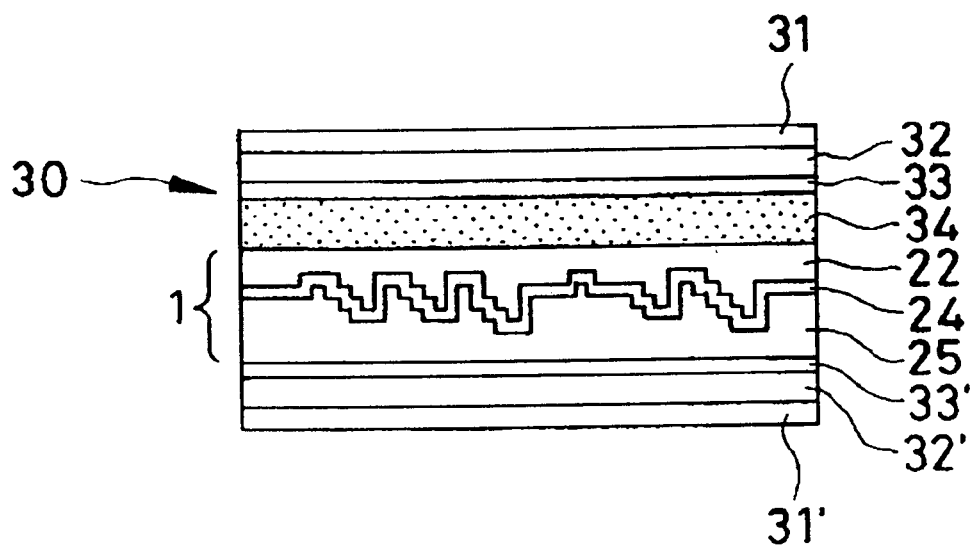

When such a computer-generated hologram 1 as shown in FIG. 23(a) or 23(b) is applied to an LCD, it may be applied between the liquid crystal layer 34 and the underlying back substrate. Alternatively, the computer-generated hologram 1, wherein the optical reflective layer 24, hologram layer 22 and adhesive layer 25 are laminated together in this order, may have previously been disposed on the lower surface of the liquid crystal layer 34, as shown in FIG. 25(b).

As a matter of course, any one of the hologram products shown in FIGS. 24(b) to 24(e) may be used as the computer-generated hologram 1, with or without the adhesive layer laminated on the surface thereof.

The aforesaid computer-generated hologram 1, because of having a smooth upper surface, can be brought in perfect contact with the back surface, etc. of a display device without any possible slanting of the hologram 1 or any possible isolation of the hologram 1 from the back surface, so that useless interference of light can be eliminated.

When such a computer-generated hologram 1 as shown in FIG. 23(a) or 23(b) is applied to a display device such as an LCD, it is preferable to make the light refractive index of the display device substantially equal to that of the computer-generated hologram (exclusive of an optical reflective layer, if any). When the computer-generated hologram and LCD are laminated together with an adhesive layer interleaved between them, it is preferred that the LCD, computer-generated hologram (exclusive of an optical reflective layer, if any) and adhesive layer have a substantially identical light refractive index.

It is here noted that the adhesive layer interleaved between the computer-generated hologram 1 and an LCD or other display device is understood to include a tackifier layer.

Since such a computer-generated hologram 1 as shown in FIG. 23(a) or 23(b) is used while the viewing side is defined by the hologram layer 22 or plastic film 23, it is preferable to form an antireflection coating on the outermost surface of the hologram 1, viz., the surface of the hologram layer 22 or plastic film 23.

Referring here to a typical antireflection coating, a transparent conductive thin film having an antistatic function and comprising indium tin oxide ($In_2O_3$ doped with tin, called ITO) or the like is laminated on the outermost surface of the computer-generated hologram 1, and an antireflection, low-refractive-index thin film having a refractive index lower than that of the transparent conductive thin film, e.g., an $SiO_2$ thin film is formed on the transparent conductive thin film. In addition, a polymethyl methacrylate resin or other hard coating layer may be interposed between the aforesaid outermost surface and the thin film for the purpose of preventing any possible injuring.

In this case, it is more preferable to use a plastic film comprising a multilayer dielectric material (for instance, HEBBAR coating made by Meresglio Co., Ltd., U.S.A.).

As can be appreciated from the foregoing explanations, the computer-generated hologram provided to achieve the first object of the present invention is constructed such that, in a range of wavelengths including the reference wavelength wherein zero-order transmission light or zero-order reflection light incident on the computer-generated hologram at a given angle of incidence is seen in white by additive color mixing, the maximum diffraction angle of incident light of the minimum wavelength in said range and incident at said angle of incidence is larger than the minimum diffraction angle of incident light of the maximum wavelength in said range and incident at said angle of incidence. Thus, the computer-generated hologram can be seen in white in the angle range defined between the maximum diffraction angle of the minimum wavelength and the minimum diffraction angle of the maximum wavelength, and there is no change in the color seen even when the viewer moves his eyes within that range. This computer-generated hologram is suitable for reflector in reflective LCDs.

According to the twelfth invention to achieve the second object of the invention, there is provided a computer-generated hologram comprising an array of identical elemental hologram pieces. It is thus possible to provide a computer-generated hologram which can reduce the length of time required for calculations and relief pattern fabrication in general, and exposure for photoetching in particular.

According to the thirteenth invention, there is provided a computer-generated hologram which, in addition to having the effect of the twelfth invention, can be seen in white in a wider range.

According to the fourteenth invention, there is provided a computer-generated hologram which, in addition to the effect of the 12th or 13th invention, have the ability to diffract both vertically incident light and obliquely incident light in the vertical direction.

According to the fifteenth invention, there is provided a computer-generated hologram which, in addition to the effect of the 12th or 13th invention, has the ability to diffract obliquely incident light toward a given viewing region and vertically incident light toward another viewing region.

According to the sixteenth invention, there is provided a computer-generated hologram which, in addition to the effect of any one of the 12th to 15th inventions, have a simple structure comprising a hologram layer alone.

According to the seventeenth invention, there is provided a computer-generated hologram which, in addition to having the effect of the 16th invention, has strong strength (because the hologram layer is supported by the transparent substrate) and can be advantageously fabricated (because the resin composition for forming the hologram layer is covered).

According to the eighteenth invention, there is provided a computer-generated hologram which, in addition to having the effect of any one of the 12th to 17th inventions, can efficiently be fabricated by the replication of the relief pattern (because the hologram is formed by the relief pattern on the surface of the hologram-forming layer.

According to the 19th or 20th invention, there is provided a computer-generated hologram which, in addition to the effect of the 18th invention, has a high optical diffraction effect because of the lamination of the optical reflective layer.

According to the 21st invention, there is provided a reflector having the same effect as that of the computer-generated hologram according to any one of the 12th to 20th inventions.

According to the 22nd or 23rd invention, there is provided a reflective liquid crystal display with the effect of the reflector according to the 21st invention added thereto.

According to the 24th invention, there is provided a computer-generated hologram fabrication process using the technique well fit for determining a hologram having the desired diffraction effect and transforming the obtained results into a relief pattern.

According to the 25th invention, there is provided a computer-generated hologram fabrication process which, in addition to having the same effect as in the 24th invention, enables a relief pattern to be efficiently formed depending on the depth and the number of steps obtained by transformation.

According to the 26th invention, there is provided a computer-generated hologram fabrication process which, in addition to having the effect of the 24th or 25th invention, can simplify the computation of phase distribution and depth and the formation of the relief pattern and can reduce computation loads on a lithography system such as a laser light or electron beam lithography system so that the relief pattern can be formed within a short time. This is because the phase distribution can be determined per elemental hologram piece rather than for the entire hologram, and the relief pattern is formed on the basis of the phase distribution obtained by repeatedly arranging the found phase distribution in the longitudinal direction of the substrate.

According to the 27th invention, there is provided a process which, in addition to having the effect of any one of the 24th to 26th inventions, enables a computer-generated hologram of high diffraction efficiency to be fabricated by the addition of the step of forming the optical reflective layer.

According to the 28th invention, there is provided a process for the efficient fabrication of a computer-generated hologram which does not only have the effect of any one of the 24th to 27th inventions, but also enables more steps to be obtained by a lesser number of photoetching cycles, because the number of steps L is given by the N-th power of 2 where N is the number of photoetching cycles.

According to the 29th invention to achieve the third object, there is provided a computer-generated hologram having a blaze pattern of sawtoothed shape in section. As in the case of a rainbow hologram, this computer-generated hologram is not affected by interference fringes resulting from higher-order light other than first-order light, so that high optical diffraction efficiency can be obtained. The blaze pattern is formed on the back side of the transparent plate so that light reciprocates in the transparent plate having a refractive index higher than that of air. Accordingly, the depth of the blaze pattern can be made smaller as compared with the case where the blaze pattern is formed on the front side of the transparent plate. In addition, the optical reflective layer can be formed with no care taken of thickness variations, etc.

According to the 30th invention, there is provided a computer-generated hologram having a blaze pattern of stepwise sawtoothed shape in section, which has much the same effect as that of the 29th invention.

According to the 31st invention, there is provided a computer-generated hologram which, in addition to the effect of the 29th or 30th invention, has more improve optical reflectivity achieved by the lamination of the optical reflective layer on and long the back side of the transparent plate.

According to the 32nd invention, there is provided a computer-generated hologram which does not only have the effect of any one of the 29th to 31st inventions but is also subject to antireflection treatment, thereby preventing the reflection of so-called ambient extraneous light or incident light for reflection at the front surface of the transparent plate or the useless reflection and, hence, wasteful consumption of a part of the necessary incident light.

According to the 33rd invention, there is provided a reflector which has the effect of any one of the 29th to 32nd inventions.

According to the 34th invention, there is provided a reflector which, in addition to having the effect of the 33rd invention, can be easily mounted on the back surface of a display device such as a liquid crystal display device through the transparent adhesive layer laminated on the front surface of the transparent plate.

According to the 35th invention, there is provided a reflective liquid crystal display which comprises a reflector having the effect of the 33rd invention, so that images can be displayed with high reflection efficiency and high contrast.

According to the 36th invention, there is provided a reflective liquid crystal display wherein the reflector having the effect of the 34th invention is laminated on the back side thereof with the transparent adhesive layer interleaved therebetween, so that images can be displayed with high optical reflection efficiency and high contrast, and the reflector can easily and surely be laminated on the liquid crystal display.

According to the 37th invention, there is provided a reflective liquid crystal display which, in addition to having the effect of the 35th or 36th invention, is free from useless diffraction because the parts used have a substantially identical light refractive index.

According to the 38th invention, there is provided a reflective liquid crystal display in which the reflector having the effect of the 33rd invention is built, so that images can be displayed with high optical reflection efficiency and high contrast.

According to the 39th invention, there is provided a reflective liquid crystal display in which the reflector having the effect of the 33rd invention is applied to a light transmission display so that images can be displayed with high optical reflection efficiency and high contrast.

What we claim is:

1. A computer-generated hologram designed to diffuse light having a given reference wavelength and incident thereon at a given angle of incidence in a specific angle range, characterized in that, in a range of wavelengths including said reference wavelength wherein zero-order transmission light or zero-order reflection light of incident light on said computer-generated hologram at a given angle of incidence is seen in white by additive color mixing, the maximum diffraction angle of incident light of the minimum wavelength in said range and incident at said angle of incidence is larger than the minimum diffraction angle of incident light of the maximum wavelength in said range and incident at said angle of incidence.

2. The computer-generated hologram according to claim 1, which comprises an array of two-dimensionally arranged minute cells, wherein each cell has an optical path length for imparting a unique phase to reflection light or transmission light, and a phase distribution obtained by adding a first phase distribution that substantially diffracts a vertically incident light beam within a given viewing region and does not substantially diffract the light beam toward other regions except for said given viewing region to a second phase distribution that allows an obliquely incident light beam at a given angle of incidence to leave the cell vertically.

3. The computer-generated hologram according to claim 1, which comprise an array of two-dimensionally arranged minute cells, wherein each cell has an optical path length for imparting a unique phase to reflection light or transmission light as well as a phase distribution which substantially diffracts an obliquely incident light beam at a given angle of incidence within a given viewing region and does not substantially diffract the light beam toward other regions except for said given viewing region and which substantially diffracts a vertically incident light beam within another region shifted from said given viewing region and does not substantially diffract the light beam toward other regions except for said another region.

4. The computer-generated hologram according to claim 2 or 3, wherein said cells are arranged in columns and rows just like checkers.

5. The computer-generated hologram according to claim 1, wherein a reflective layer is provided on a relief pattern provided on a surface of the substrate.

6. The computer-generated hologram according to claim 1, which is adaptable to the minimum wavelength of 450 nm and the maximum wavelength of 650 nm.

7. The computer-generated hologram according to claim 1 which satisfies:

$$\lambda_{MIN}/\lambda_{MAX} \geq (\sin \beta_{1STD} - \sin \theta)/(\sin \beta_{2STD} - \sin \theta) \quad (11)$$

where $\theta$ is an angle of incidence of illumination light, $\lambda_{MIN}$ is the minimum wavelength, $\lambda_{MAX}$ is the maximum wavelength, $\beta_{1STD}$ is the minimum diffraction angle at a given reference wavelength $\lambda_{STD}$ and $\beta_{2STD}$ is the maximum diffraction angle at the given reference wavelength $\lambda_{STD}$.

8. The computer-generated hologram according to claim 1 which satisfies:

$$\sin \theta \geq (\lambda_{MAX} \sin \beta_{1STD} - \lambda_{MIN} \sin \beta_{2STD})/(\lambda_{MAX} - \lambda_{MIN}) \quad (12)$$

where $\theta$ is an angle of incidence of illumination light, $\lambda_{MIN}$ is the minimum wavelength, $\lambda_{MAX}$ is the maximum wavelength, $\beta_{1STD}$ is the minimum diffraction angle at a given reference wavelength $\lambda_{STD}$ and $\beta_{2STD}$ is the maximum diffraction angle at the given reference wavelength $\lambda_{STD}$.

9. A display system, which uses the computer-generated hologram according to claim 1 as a reflector.

10. A reflective liquid crystal display, wherein the computer-generated hologram according to claim 1 is disposed as a reflector on a back surface thereof.

11. A reflective liquid crystal display, wherein the computer-generated hologram according to claim 1 is interposed as a reflector between a liquid crystal layer thereof and a back surface substrate thereof.

12. A computer-generated hologram comprising minute elemental hologram pieces closely arranged on a plane, wherein each elemental hologram piece has an optical path length enough to impart an identical phase distribution to reflection light or transmission light and wherein the computer-generated hologram is designed to diffuse light having a given reference wavelength and incident thereon at a given angle of incidence in a specific angle range, wherein, in a range of wavelengths including said reference wavelength wherein zero-order transmission light or zero-order reflection light incident on said computer-generated hologram at a given angle of incidence is seen in white by additive color mixing, the maximum diffraction angle of incident light of the minimum wavelength in said range and incident at said angle of incidence is larger than the minimum diffraction angle of incident light of the maximum wavelength in said range and incident at said angle of incidence.

13. The computer-generated hologram according to claim 12, wherein each elemental hologram piece has a phase distribution obtained by adding a first phase distribution that substantially diffracts a vertically incident light beam within a given viewing region and does not substantially diffract the light beam toward other regions except for said given viewing region to a second phase distribution that allows an obliquely incident light beam at a given angle of incidence to leave the elemental hologram piece vertically.

14. The computer-generated hologram according to claim 12, wherein each elemental hologram piece has a phase distribution which substantially diffracts an obliquely incident light beam at a given angle of incidence within a given viewing region and does not substantially diffract the light beam toward other regions except for said given viewing region and which substantially diffracts a vertically incident light beam within another region shifted from said given viewing region and does not substantially diffract the light beam toward other regions except for said another region.

15. The computer-generated hologram according to claim 12, which comprises a resin layer including a hologram.

16. The computer-generated hologram according to claim 15, which further comprises a transparent substrate for supporting the resin layer including a hologram.

17. The computer-generated hologram according to claim 12, which is defined by a relief pattern on a surface of a hologram-forming layer.

18. The computer-generated hologram according to claim 17, which further comprises an optical reflective layer stacked on and along said relief pattern.

19. The computer-generated hologram according to claim 17, wherein said optical reflective layer is laminated on the other bare surface of said hologram-forming layer which is free from said relief pattern.

20. A reflector which uses the computer-generated hologram according to claim 12.

21. A reflective liquid crystal display, wherein the computer-generated hologram according to claim 20 is disposed on a back surface thereof.

22. A reflective liquid crystal display, wherein the computer-generated hologram according to claim 20 is interposed between a liquid crystal layer and a back substrate in said liquid crystal display.

* * * * *